United States Patent
Sudo et al.

(10) Patent No.: US 7,860,235 B2
(45) Date of Patent: Dec. 28, 2010

(54) ECHO SUPPRESSOR

(75) Inventors: Takashi Sudo, Fuchu (JP); Takehiko Isaka, Hachioji (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1130 days.

(21) Appl. No.: 11/339,273

(22) Filed: Jan. 25, 2006

(65) Prior Publication Data

US 2007/0036343 A1 Feb. 15, 2007

(30) Foreign Application Priority Data

May 27, 2005 (JP) ............................. 2005-155741

(51) Int. Cl.
H04M 9/06 (2006.01)
(52) U.S. Cl. .............................. 379/406.01; 379/406.07
(58) Field of Classification Search ............ 379/406.01, 379/406.07
See application file for complete search history.

(56) References Cited

U.S. PATENT DOCUMENTS

| | | | | |
|---|---|---|---|---|
| 5,940,499 A * | 8/1999 | Fujii et al. | ............. | 379/388.05 |
| 6,408,070 B2 * | 6/2002 | Farra | ..................... | 379/406.01 |
| 6,415,029 B1 * | 7/2002 | Piket et al. | ............. | 379/406.04 |
| 6,816,591 B2 * | 11/2004 | Terada et al. | ........... | 379/406.01 |
| 6,901,143 B1 * | 5/2005 | Ono | ........................... | 379/414 |

FOREIGN PATENT DOCUMENTS

| JP | 06-078046 A | 3/1994 |
|---|---|---|
| JP | 3160228 | 2/2001 |
| JP | 2002-64618 A | 2/2002 |
| JP | 2002359580 A * | 12/2002 |
| JP | 3466050 | 8/2003 |

OTHER PUBLICATIONS

Japanese Office Action (and English translation) dated Jul. 1, 2008, issued in a counterpart Japanese Application.
K. Fujii et al; "A Voice Switch Control System Available to Prevent from Blocking"; The Institute of Electronics, Information and Communication Engineers (IEICE) Transactions, vol. J80-A, pp. 587-596; Apr. 1997.
Japanese Office Action dated Jul. 1, 2008 (and English translation thereof) issued in counterpart Japanese Application No. 2005-155741.
"Background Art Information" —previously submitted with the IDS filed in the present U.S. application on Jan. 25, 2006.

* cited by examiner

*Primary Examiner*—Alexander Jamal
*Assistant Examiner*—Mohammad K Islam
(74) *Attorney, Agent, or Firm*—Holtz, Holtz, Goodman & Chick, PC

(57) ABSTRACT

A received power calculating section and a sending power calculating section calculate a received power value Rcv_Power(t) and a sending power value Snd_Power(t) by respectively adding predetermined gain values when the received power calculating section and the sending power calculating section calculate the received power value Rcv_power(t) and the sending power value Snd_Power(t). A received detection value control section and a sending detection value control section control the calculated receiving detection value and the sending detection value and set the received detection value and the sending detection value so as not to become less than a predetermined lower limit value, respectively.

14 Claims, 20 Drawing Sheets

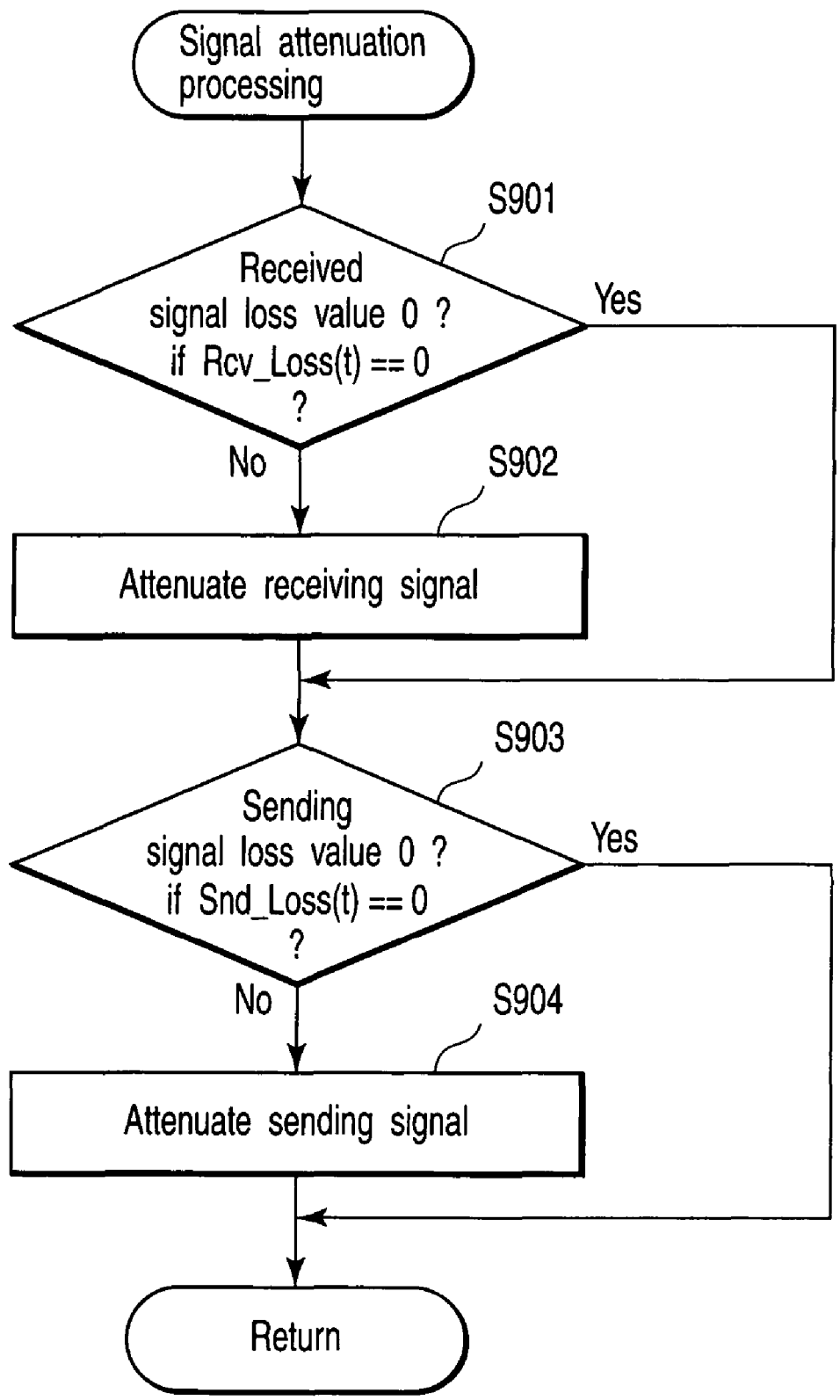
F I G. 16

ECHO SUPPRESSOR

CROSS-REFERENCE TO RELATED APPLICATIONS

This application is based upon and claims the benefit of priority from prior Japanese Patent Application No. 2005-155741, filed May 27, 2005, the entire contents of which are incorporated herein by reference.

BACKGROUND OF THE INVENTION

1. Field of the Invention

The present invention relates to an echo suppressor (voice switch) provided for performing an acoustic echo removal and preventing howling in a communication device such as a standard telephone, a hands-free telephone, an interphone, a mobile telephone and a television conference system.

2. Description of the Related Art

A communication device having a function to perform hands-free communication by using a loudspeaker and a microphone instead of a handset has such advantages that both hands of a user become free and a many person conference become possible. However, the use of the loudspeaker and the microphone forms a go-around closed-loop via acoustic coupling, and if closed-loop gain exceeds 1, howling is usually generated and communication usually becomes difficult. Therefore, it is necessary to take any measure to maintain so that the closed-loop gain never exceeds 1 in order to secure stable communication by the communication device having the function to perform the hands-free communication.

An echo suppressor is conceivable as one of the measures. The echo suppressor monitors signal levels in each send path and receive path and suppresses the closed-loop gain so as not to exceed 1 by inserting a loss into a communication path in which it is determined that a signal does not include any speech. The echo suppressor computes in an easier way than that of an echo canceller and does not require a large capacity of a memory to store an adaptive filter coefficient, a status variation, etc., so that it has an advantage that it can be realized at a low cost.

It is necessary, however, for the echo suppressor to take the following points into account so as to establish effective control:

(1) If the acoustic echo of the received signal with the speech of a far-end user output from the loudspeaker included therein sneaks into the microphone and if the acoustic echo is superimposed onto the sending signal with the speech of a near-end user included therein, it is hard to distinguish each of the signals. This fact suggests that it is difficult to determine communication directions in an environment where the acoustic echo is prone to occur. Switching of the echo suppressor resulting from erroneous determination that the acoustic echo is the speech of the near-end user interrupts, in the middle of generation, the speech of the far-end user included in the received signal and degrades communication quality.

(2) If it is determined that the received signal does not include any speech therein, it is absolutely essential to switch a communication direction from a receiving direction to a sending direction as soon as possible so as to secure a simultaneous conversation property. However, if the echo suppressor is switched at high speed, end of a word in the speech of the far-end user included in the received signal is interrupted. This phenomenon is called receiving blocking. The acoustic echo is transmitted on a far-end by the switching at a high speed and the user on the far-end feels about the acoustic echo. If the echo suppressor on the far-end determines that the acoustic echo is the speech of the near-end user and switches the communication direction from the sending direction to the receiving direction, subsequently input speeches of the far-end user are interrupted by the echo suppressor on the far-end. This phenomenon is called sending blocking.

Conventionally, a variety of arts have been proposed to prevent occurrences of the receiving and sending blocking:

(1) An art to detect voice activity in an input signal to count the length of a state (active voice state or non-active voice state) by a counter and determine that the state is the active voice state or the non-active voice state when the counted time lasts for not less than a predetermined time period (Jpn. Pat. No. 3,466,050).

(2) An art to provide a provisional state between a sending state and a receiving state (The Institute of Electronics, Information and Communication Engineers Transactions, Vol. J80A No. 4 pp. 587-596, April, 1997).

(3) An art to adaptively change a threshold in response to a maximum value and a difference between the maximum value and a minimum value of input signal power and distinguish between a speech section and a non-speech section of the input signal on the basis of the threshold (Jpn. Pat. No. 3,160,228).

(4) An art to calculate a threshold for speech section detection by taking a signal-to-noise ratio into account (Jpn. Pat. Appln. KOKAI Publication No. 2002-64,618).

In the prior art (1), however, the receiving state or the sending state lasts for a specified time period regardless of the power of the speech included in the input signal. Accordingly, in a device having a user volume controller, if a user performs a changing operation of the volume controller, a communication state becomes unnatural and a communication quality is deteriorated.

The art in (2) suppresses a background noise on the far-end to not more than a background noise level on the near-end; therefore, this art is apt to be affected by fluctuation in the background noise level and become unstable in operations. This fact becomes problematic specifically in a mobile communication terminal frequently used in an environment tending to vary in the background noise.

The device having the user volume controller is prone to overflow depending on a volume varying operation by the user. The prior art (3), however, is weak in overflow of signal power and a threshold to be a reference is not varied even when the user operates the volume controller, so that the speech section detection tends to become unstable.

The prior art (4) varies the signal-to-noise ratio when the signal power overflowed; therefore, the threshold for the speech detection has a not appropriate value. A calculation amount becomes large resulting from taking the signal-to-noise ratio into account.

BRIEF SUMMARY OF THE INVENTION

An object of the present invention to provide an echo suppressor capable of switching at a high speed within a range not causing blocking and also capable of achieving this switching processing through a small amount of calculation amount and without being affected by operations to change a setting of a user volume controller and by fluctuations in a background noise level.

To achieve the above-mentioned object, an echo suppressor of this invention comprises received power calculation means for calculating a received power value by calculating power of a received signal and adding a first gain value to be set from outside before communication starts to the calculated power, sending power calculation means for calculating sending power value by calculating power of a sending signal and adding a second gain value to be set from outside before the communication starts to the calculated power, receiving detection value calculation means for calculating a receiving detection value to detect a receiving section on the basis of the calculated received power value, sending detection value calculation means for calculating a sending detection value to detect a sending section on the basis of the calculated sending power value, receiving detection value controlling means for controlling the calculated receiving detection value, sending detection value controlling means for controlling the calculated sending detection value, received signal attenuating means for attenuating the received signal, sending signal attenuating means for attenuating the sending signal, and state determination means for determining whether a state is a receiving state or a sending state on the basis of the calculated received power value, the sending power value, the receiving detection value controlled by the receiving detection value controlling means, and the sending detection value controlled by the sending detection value controlling means, and for controlling attenuation processing operations of the received signal attenuating means and the sending signal attenuating means on the basis of the result of the determination.

The receiving detection value controlling means includes means for adding a third gain value to the calculated receiving detection value when the fact that the calculated receiving detection value is not more than the calculated received power value lasts for a first time period, means for controlling the calculated receiving detection value so as not to become less than a first lower limit value to be set on the basis of an acoustic coupling amount on a far-end and a receiving volume value on a near-end, means for initializing the receiving detection value calculated at every switching of a state determined by the state determining means from the receiving state to the sending state, means for initializing the calculated receiving detection value when the state determined by the determining means is the sending state and at every change in sign of difference between the calculated sending power value and the calculated sending detection value, and means for initializing the calculated receiving detection value to a value larger than a maximum value of the calculated received power value at the beginning of the communication and when initialization is set.

Further, the sending detection value controlling means includes means for adding a fourth gain value to the calculated sending detection value when the fact that the calculated sending detection value is not more than the calculated sending power value lasts for a second time period, means for controlling the calculated sending detection value so as not to become less than a second lower limit value to be set on the basis of an acoustic coupling amount on the near-end, means for initializing the calculated sending detection value at every switching of the state determined by the state determining means from the sending state to the receiving state, means for initializing the calculated sending detection value when the state determined by the determining means is the receiving state and at every change in sign of difference between the calculated received power value and the calculated receiving detection value, and means for initializing the calculated sending detection value to a value larger than a maximum value of the calculated sending power value at the beginning of the communication and when the initialization is set.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 16 is a flowchart showing procedures and contents of signal attenuation processing in the control procedures shown in FIG. 4;

DETAILED DESCRIPTION OF THE INVENTION

Hereinafter an embodiment of the present invention will be explained by referring drawings.

Figure 1:
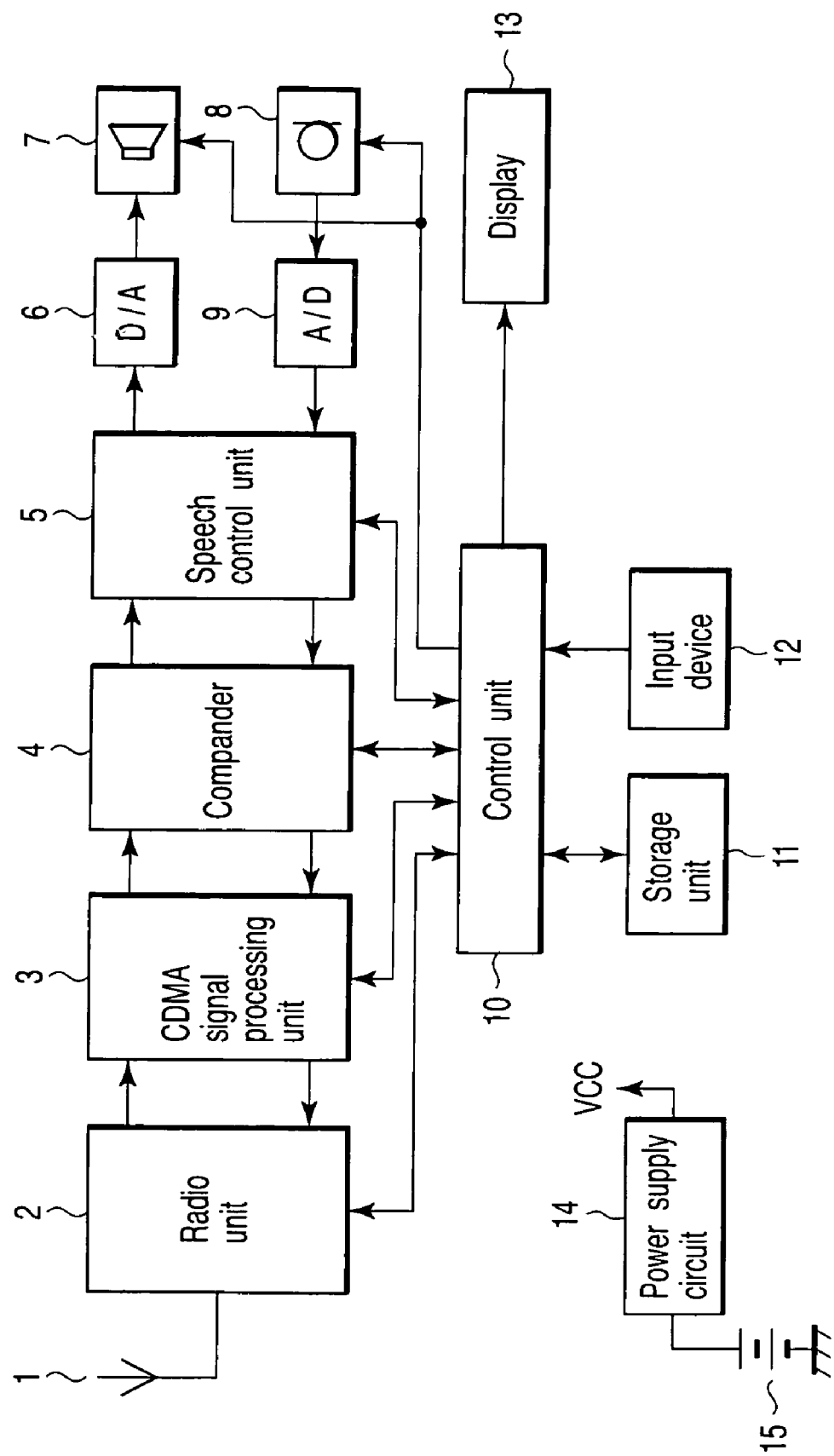
FIG. 1 is a block diagram showing an embodiment of a mobile communication terminal having an echo suppressor regarding the present invention.

FIG. 1 is a block diagram showing a configuration of a mobile telephone having an echo suppressor regarding the present invention.

A radio signal transmitted from a base station (not shown) is received at an antenna 1 then it is input to a radio unit 2. The radio unit 2 frequency-converts the received radio signal into an intermediate signal, then, performs quadrature modulation to generate a receiving base band signal and inputs it to a CDMA signal processing unit 3.

The processing unit 3 has an RAE receiver. The RAE receiver executes reverse diffusion processing to a plurality of paths included in the received base band signal by using spread codes, respectively. After arbitrations of phases of signals of each path which has been respectively executed the reverse diffusion processing, the signals are synthesized. Thereby, receiving packet data in a predetermined sending format can be obtained. The packet data is input to a compression/expansion processing unit (hereinafter referred to as compander) 4.

The compander 4 separates the packet data which is output from the processing unit 3 though a multiplex/demultiplex unit at every medium. Then, the compander 4 respectively performs demodulation processing to the separated data at every medium. In a communication mode, for example, the compander 4 demodulates receiving data included in the packet data by means of speech codec. The compander 4 also demodulates video data by means of video codec if the video data is included in the packet data.

The digital received signal demodulated by the speech codec is input to a digital-to-analog converter 6 after passing through the after-mentioned speech control unit 5, then the received signal is converted into an analog received signal there. A loudspeaker unit 7 receives the analog received signal and loudly outputs it as the received signal. The signal which is output toward an acoustic space in this way is acoustic-coupled with a sending signal and collected at a microphone unit 8. The digital video signal demodulated by the compander 4 is input to a control unit 10. The control unit 10 displays the digital video signal which is output from the compander 4 onto a display 13.

On the other hand, in the communication mode, an analog-to-digital converter 9 converts the sending signal being input to the microphone unit 8 into a digital sending signal and inputs it to the compander 4 through the control unit 5. In a television telephone mode, the control unit 10 digitizes a video signal being output from a camera (not shown) to input it to the compander 4.

The compander 4 encodes the input digital sending signal through the speech codec and generates transmitting video data. The multiplex/demultiplex unit packetizes the sending data and the transmitting video data in accordance with a predetermined sending format and supplies the transmitting packet to the CDMA signal processing unit 3.

The processing unit 3 performs spectrum spreading processing to the transmitting packet which is output from the compander 4 by using the spread code. The processing unit 3 outputs the processed transmitting packet to the radio unit 2. The radio unit 2 modulates the spread signal by using, for example, a quadrature phase shift keying (QPS) method. The radio unit 2 frequency-converts the transmitting signal generated by this modulation into a radio signal, then, high frequency-amplifies the radio signal so as to become a sending power level instructed by the control unit 10. The amplified radio signal is supplied to the antenna 1 and transmitted from the antenna 1 toward a base station.

The control unit 10, for example, has a microprocessing unit (MPU), and has a control function for an after-mentioned echo suppressor (ES) 52 to be a control function regarding the present invention. The control unit 10 also has an echo canceller (EC) 53 and a noise suppressor (NS) 54.

A storage unit 11 uses, for example, an EEPROM or a hard disk as a storage medium and stores a variety of programs and items of data necessary for a communication operation. An input device 12 has a key pad, a cursor key, a user volume input unit 121, a mode input unit 122, and the like to be used so that a user inputs information necessary for the communication operation. The volume input unit 121 accepts a volume of the received signal to be set by the user, through a key input, an operation of a knob of the input unit 121, etc. The control unit 10 outputs the volume information indicating the accepted magnitude of the volume which is set by the user.

The mode input unit 122 accepts the mode desired by the user through the key input or the operation of the knob of the volume input unit 121. The control unit 10 outputs the mode information indicating the accepted mode. The communication mode includes, for example, a through mode (OFF of functions of the ES 52, EC 53 and NS 54), a handset mode (handset communication using a loudspeaker for a handset), a hands-free mode (hands free communication using a loudspeaker for hands-free), an earphone mode (communication using an earphone) and an external equipment connection mode (communication using an externally connected loudspeaker).

A power supply circuit 14 generates a predetermined operational power supply voltage Vcc on the basis of a power supply being output from a battery 15 and supplies it to each circuit unit. The battery 15 is charged by a charge circuit (not shown).

Figure 2:
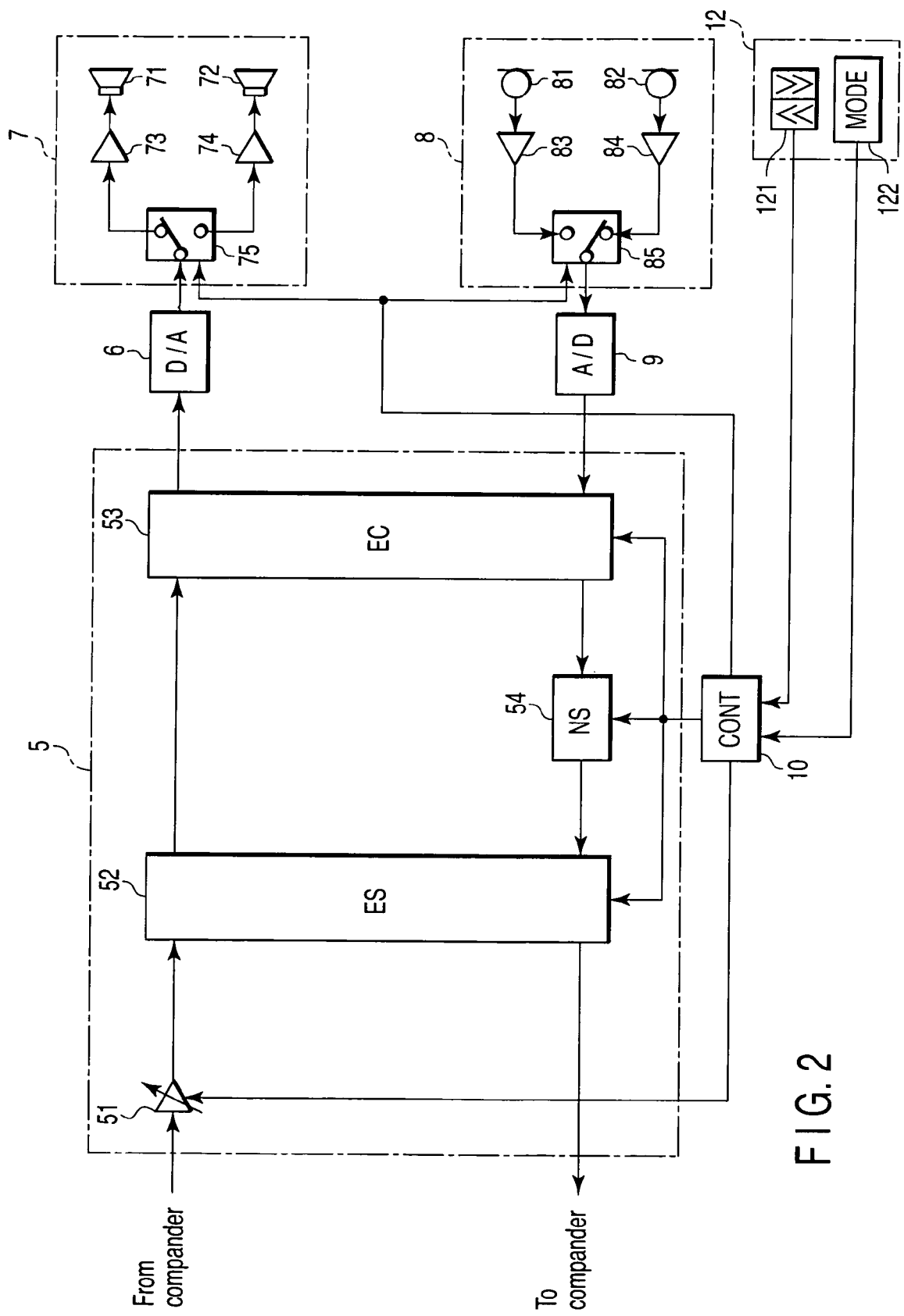
FIG. 2 is a block diagram showing a configuration of the echo suppressor and its peripheral section to be a principal section of the communication terminal shown in FIG. 1.

By the way, the speech control unit 5, the loudspeaker unit 7 and the microphone unit 8 are configured as follows. FIG. 2 is a view showing the configuration.

The speech control unit 5 comprises a receiving user volume controller 51, the ES 52, the EC 53 and the NS 54. The volume controller 51 is disposed between the compander 4 and the ES 52.

The EC 53 reduces an acoustic echo included in the sending signal and outputs a sending signal with the echo suppressed therein. The EC 53 is composed of, for example, a transversal filter and operated by an adaptive algorithm such as a learning identification method (NLMS algorithm and so on).

The NS 54 suppresses a noise component included in the sending signal and outputs a sending signal with the noise component suppressed therein. The NS 54 operates, for example, a spectral subtraction method or a minimum mean-square error short-time spectral amplitude estimator (MMSE-STSA) method.

The control unit 10 refers a built-in data table to decide a user volume gain value on the basis of the volume information in accordance with operations of the volume input unit 121 and the mode information in accordance with operations of the mode input unit 122. The control unit 10 gives the gain value to the volume controller 51 to control the gain of the volume controller 51.

Table 1 shows an example of the data table incorporated by the control unit 10. In this example, there are five stages of 1-5 of volume values selectable by the volume input unit 121, and if there are three modes of a mode "0", a mode "1" and a mode "2", being selectable by the mode input unit 122, Table 1 shows the case that user volume gain values associated with these modes are stored in the data table by dB unit. The gain values may be stored by dB unit or by multiplication coefficient unit of gains.

TABLE 1

| User volume controller gain value [dB] | | Volume information | | | | |
|---|---|---|---|---|---|---|
| | | 1 | 2 | 3 | 4 | 5 |
| Mode information | 0 | +2 | +2 | +7 | +12 | +17 |
| | 1 | −15 | −10 | −5 | 0 | +5 |
| | 2 | −5 | 0 | +5 | +10 | +15 |

The control unit 10 controls ON/OFF switching of the function of the EC 53, change in inner parameters, ON/OFF switching of the function of the NS 54, strength/weakness switching of a noise suppressed amount or the like on the basis of the volume information and mode information.

The loudspeaker unit 7 comprises a handset loudspeaker 71, a hands-free loudspeaker 72, receiving amplifiers 73, 74 for respectively driving the loudspeakers 71, 72 and a receiving switching circuit 75. The control unit 10 switch-controls the switching circuit 75 on the basis of the mode information in accordance with operations of the mode input unit 122 and connects either the loudspeaker 71 or 72 to the receive path.

The microphone 8 composed of a handset microphone 81, a hands-free microphone 82, and sending amplifiers 83, 84 for respectively amplifying the sending signals which are output from the microphones 81, 82, and a sending switching circuit 85. The control unit 10 switch-controls the switching circuit 85 on the basis of the mode information then connects either the microphone 81 or 82 to the send path.

It is possible to use an external unit as substitute for the loudspeaker unit 7 and the microphone unit 8 without using them. The external unit includes a cable-connected car kit, a headset for radio communication connection, or the like. In the case of use of such an external unit, an external unit connection mode is selected. Similarly, it is assumed to connect an earphone microphone. In this case, an earphone mode is selected.

Figure 3:
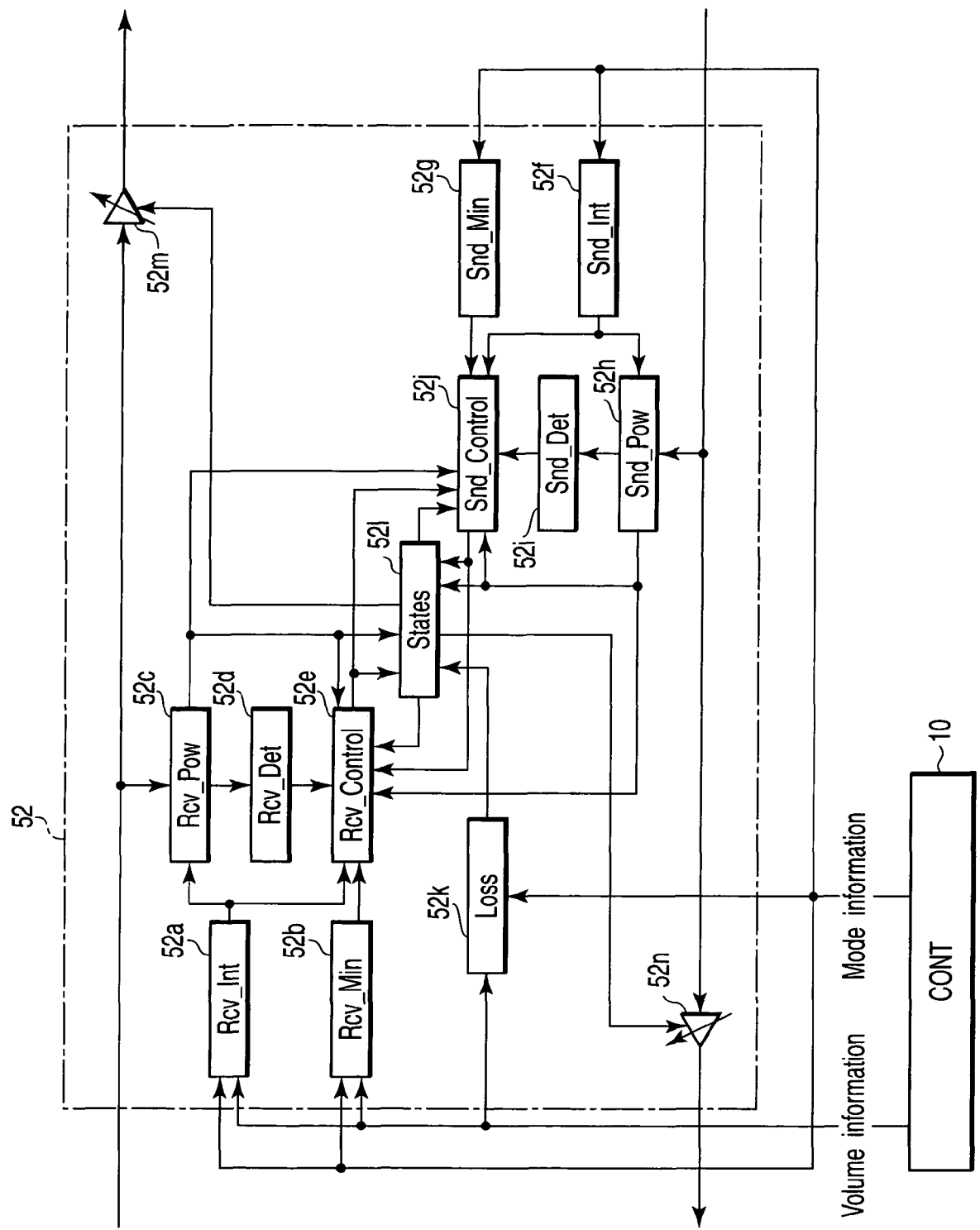
FIG. 3 is a block diagram showing a functional configuration of an echo suppressor regarding one embodiment of the present invention.

The ES 52 is composed as follows. FIG. 3 is a functional block diagram showing the configuration of the ES 52.

The ES 52 has a received signal attenuating section 52m disposed on the receive path, a sending signal attenuating section 52n disposed on the send path, a receiving control block, a sending control block and a main control block.

The receiving control block includes a receiving gain value storage section (Rcv_Int) 52a, a receiving lower limit value storage section (Rcv_Min) 52b, a received power calculating section (Rcv_Pow) 52c, a receiving detection value calculating section (Rcv_Det) 52d and a receiving detection value control section (Rcv_Control) 52e.

The storage section 52a outputs a receiving gain value φr a gain to a received power value (Rcv_Power) toward the calculating section 52c and the control section 52e on the basis of each mode information and each volume information which is output from the control unit 10.

Table 2 shows an example of a data table incorporated by the storage section 52a. In the case that the mode information to be output from the control unit 10 includes three modes of the mode "0", the mode "1" and the mode "2" and the volume information to be output from the control unit 10 includes five stages of 1-5, the data table stores the receiving gain values φr associated with these modes and stages by dB unit. The receiving gain values may be stored by dB unit or by multiplication coefficient unit of the gains.

TABLE 2

| Receiving gain value φr [dB] | | Volume information | | | | |
|---|---|---|---|---|---|---|
| | | 1 | 2 | 3 | 4 | 5 |
| Mode information | 0 | 0 | 0 | 0 | 0 | 0 |
| | 1 | 0 | 0 | 0 | +2 | +2 |
| | 2 | +2 | +2 | +2 | +2 | +2 |

The receiving gain value φr is set on the basis of design of the volume controller 51 and a level diagram of an analog front-end. The analog front-end includes, for example, the digital-to-analog converter 6, the receiving switching circuit 75, the receiving amplifiers 73, 74, the loudspeaker 71, 72, the microphone 81, 82, the transmitting switching circuit 85, and the analog-to-digital converter 9.

In this configuration, the mobile communication terminal can balance the signal power of the received signal and the sending signal even if any value is set as the setting values of the volume controller 51, the receiving amplifiers 73, 74 and the sending amplifiers 83, 84. Even if the sending power become larger than the received power in accordance with the setting operation of the volume controller 51 or the design of the level diagram, the user can correctly determine the receiving state/sending state at the beginning of a start of communication. Further, in the case of another communication device, other mode information and other volume information, the communication device can utilize the setting value which has balanced once, as the reference value, thereby the communication device facilitates the volume controller 51 in adjustment. For example, assuming that the case of volume "5" in mode "0" is the reference, the setting value of the volume controller 51 becomes larger by 2 dB in the case of volume "5" in mode "2", and the received signal becomes larger by 2 dB therewith. Therefore, the receiving gain value Or is set to 2 dB.

The receiving gain value Or may be set from outside before the communication starts and may be arbitrarily set through the key operation by the user by means of the input device 12. In this way, the user can change the priority of the received signal. By setting the priority, for example, the user can select the setting to eliminate interruption feelings of the received signal and not to transmit any acoustic echo to the sending signal as much as possible and the setting to transmit the sending signal without its interruption. That is, the user can achieve the switching of the echo suppressor corresponding to the favorite thereof.

The gain value φr may be set as a time varying value which is made by adding a specified value to (or subtracting a specified value from) a gain value based on the mode information and the volume information which is output from the control unit 10.

The specified value is set on the basis of the correlation between the received signal and the sending signal at every predetermined period of time (for example, by frame corresponding to processing interval, by speech codec frame, etc.). In this way, a lot of acoustic echo in the signal which has been input onto the send path can enhance the priority of the received signal and prevent the acoustic echo from being sent to the far-end.

The Rcv_Min 52 outputs the Rcv_Detect_Min being a lower limit value of the Rcv_Detect(t) on the basis of each mode information and each volume information being output from the control unit 10. Table 3 shows an example of the data table incorporated by the Rcv_Min 52. In the case of the mode information being output from the control unit 10 includes three modes of the mode "0", mode "1" and mode "2" and the volume information being output from the control unit 10 includes five stages of 1-5, the data table stores the Rcv_Detect_Min associated with these modes and stages by dB. The Rcv_Detect_Min may be stored by dB or by multiplication coefficient.

TABLE 3

| Receiving detection lower limit value Rcv_Detect_Min [dB] | | Volume information | | | | |
|---|---|---|---|---|---|---|
| | | 1 | 2 | 3 | 4 | 5 |
| Mode information | 0 | +55 | +55 | +55 | +55 | +55 |
| | 1 | +67 | +72 | +77 | +82 | +87 |
| | 2 | +77 | +82 | +87 | +92 | +97 |

The above-described Rcv_Detect_Min may be set on the basis of the acoustic coupling amount and the level diagram on the far-end. The sending signal on the near-end is snaked as the acoustic echo onto the far-end send path after being output from the remote side receive path and output from the near-end receive path again. The power level of the acoustic echo returned to the near-end through the far-end is actually measured or estimated on the basis of the acoustic coupling amount on the far-end. The Rcv_Detect_Min is set so as to become larger than the measured or estimated power level.

By setting like this, the communication terminal can prevent sending blocking caused by the acoustic echo which will probably return from the near-end receiving side through the far-end. For example, if the gain of the volume controller on the far-end is +10 dB, the gain of the receiving amplifier on the far-end is +7 dB, the acoustic coupling amount on the far-end is −53 dB and the gain of the sending amplifier on the far-end is +40 dB, and in the case of volume "3" in the mode "2", the gain of the volume controller 51 on the near-end becomes +5 dB. The power level of the acoustic echo included in the received signal on the near-end returned through the far-end against the sending signal on the near-end with the power value 78 dB being a standard volume becomes 87 (=78+10+7−53+40+5) dB. Consequently, the Rcv_Detect_Min is set to 87 dB.

The Rcv_Pow 52c calculates the Rcv_Power(t) of the received signal which is input to the ES 52 at every predetermined period of time (for example, by frame corresponding to processing interval, by speech codec frame, etc.) on the basis of the receiving gain value read out from the Rcv_Int 52a. By calculating a square sum of a sample value x(i) of N samples included in one period of time decided in advance (for example, by frame corresponding to processing interval, by speech codec frame, etc.), at every predetermined period of time, the received power value (Rcv_Power) at a certain time "t" can be obtained. Where, the Rcv_Power(0) at the beginning of the communication (time t=0) is set to 0.

In other words, the Rcv_Power(t) being the received power value at time t can be obtained by calculating in Equation 1

$$\text{Rcv\_Power}(t) = \sum_{i=0}^{N-1} x^2(i)$$

or by calculating a logarithm of the square sum then multiplying it by 10.

Or, the Rcv_Power(t) may be obtained by calculating in Equation 2

$$\text{Rcv\_Power}(t) = 10 \log_{10}\left(\sum_{i=0}^{N-1} x^2(i)\right)$$

or by averaging the power values in a plurality of continuous sections.

The calculated Rcv_Power(t) is updated. Update processing is performed by adding the receiving gain value $\phi r$ read out from the Rcv_Int 52a to the Rcv_Power(t) at every predetermined period of time (for example, by frame corresponding to processing interval, by speech codec frame, etc.). The calculating formula (Equation 3) is listed below.

$$\text{Rcv\_Power}(t) = \text{Rcv\_Power}(t) + \phi r$$

Further, the Rcv_Power(t) is updated by using a forgetting coefficient $\lambda r$ ($0 \leq \lambda r \leq 1$, for example, $\lambda r = 0.375 - 0.999$). The calculating formula (Equation 4) is listed below. However, an operator max(.,.) stands for the maximum of the two arguments.

$$\text{Rcv\_Power}(t) = \max(\text{Rcv\_Power}(t), \lambda r \cdot \text{Rcv\_Power}(t-1))$$

That is the Rcv_Power(t) is expressed by dB by obtaining a logarithm of a square sum of the sample value and multiplying it by 10. Then, the Rcv_Power(t) is calculated by adding the gain value $\phi r$ read out from the Rcv_Int 52a and reflecting the forgetting coefficient $\lambda r$ to the result of the addition.

The Rcv_Power(t) calculated like this is input to the Rcv_Det 52d, the Rcv_Control 52e, a sending detection value control section Snd_Control 52j and a state determining section States 52l.

The Rcv_Det 52d calculates the Rcv_Detect(t) for detecting the receiving section on at every predetermined period of time (for example, by frame corresponding to processing interval, by speech codec frame, etc.) on the basis of the Rcv_Power(t) calculated by the Rcv_Pow 52c.

The Rcv_Detect(t) is adaptively updated at every predetermined period of time (for example, by frame corresponding to processing interval, by speech codec frame, etc.) on the basis of the Rcv_Power(t) at a current time and the Rcv_Detect(t−1) at a time before one former period of time.

As for one example, $\alpha r \approx 0.914$, $\beta r \approx 0.86$, $\gamma r \approx 0.00002$, $\phi r = 10$ dB are used as like following Equation 5.

When $Rcv\_Power(t)+\phi r < Rcv\_Detect(t-1)$, $Rcv\_Detect(t)=\alpha r \cdot Rcv\_Power(t)+\phi r < Rcv\_Detect(t-1)+\gamma r$ when $Rcv\_Power(t)+\phi r \geq Rcv\_Detect(t-1)$, $Rcv\_Detect(t)=Rcv\_Detect(t-1)$ Where, a constant term γr at the time of receiving detection value calculation may be set on the basis of variance of an amplitude value of noise components included in the received signal. By setting in this way, it becomes possible to make the Rcv_Detect(t) resistant against variations of the noise included in the received signal. The Rcv_Detect(t) calculated in this way is input to the Rcv_Control 52e.

The Rcv_Control 52e controls the Rcv_Detect(t) output from the Rcv_Det 52d at every predetermined period of time (for example by frame corresponding to processing interval, by speech codec frame, etc.).

The ES 52 conducts, for example, the following control so that the Rcv_Detect(t) will not become less than the Rcv_Detect_Min. At first, the ES 52 determines if the Rcv_Detect(t) is less than the Rcv_Detect_Min read out from the Rcv_Min 52b. If the Rcv_Detect(t) is less than the Rcv_Detect_Min as the result of the determination, the ES 52 updates the Rcv_Detect(t) to the Rcv_Detect_Min and outputs the updated Rcv_Detect(t) to the state determining section States 52l in accordance with the following Equation 6.

When $Rcv\_Detect(t) \geq Rcv\_Detect\_Min$, $Rcv\_Detect(t)=Rcv\_Detect(t)$ when $Rcv\_Detect(t) < Rcv\_Detect\_Min$, $Rcv\_Detect(t)=Rcv\_Detect\_Min$ The Rcv_Control 52e increments a receiving detection value counter Rcv_Detect_Count in the case of $Rcv\_Power(t)+\phi r \geq Rcv\_Detect(t-1)$ in an update processing of the Rcv_Detect(t) in the Rcv_Det 52d. When the value of the Rcv_Detect_Count has reached the preset constant value θr, the value of the Rcv_Detect_Count is set to 0. At the same time, a constant value δr is added to the Rcv_Detect (t). This constant value δr is possible to sufficiently trace variation widths of the noise components included in the received signal and is set so as not react against the speech in the received signal. The constant values θr and δr are set to values so that the update amount per 1 sec becomes the extent of 0.1-3.5 dB. Specifically, the constant values θr and δr are set 0.3 sec and 0.5 dB, respectively. By setting to such values, the ES 52 can prevent the unnecessary long continuation of the state in which a loss is inserted in either send path or receive path when the receiving detection value Rcv_Detect(t) becomes extremely small or the long time averaged power of noises has varied.

Furthermore, the Rcv_Control 52e initializes the Rcv_Detect(t) on the basis of state information [value of States(t)] at the beginning of the communication (time t=0) and output from the state determining section 52l. More specifically, the Rcv_Control 52e initializes the Rcv_Detect(t) at every switching [States(t-1)=1 and States(t)=0] of the state information determined by the state determining section 52l from "receiving state" to "sending state". The Rcv_Control 52e initializes the Rcv_Detect(t) in the case that the state information determined by the state determining section States 52l is "sending state [States(t)=0]" and also at every change in the sign of difference between the sending power value Snd_Power(t) and the sending detection value Snd_Detect(t) (from plus sign to minus sign or from minus sign to plus sign). In this way, the ES 52 can be prevented from being switched frequently to an excessive degree. And the state determination in the ES 52 is hardly affected by the variations in the background noise.

Here, at the time of initial setting, the Rcv_Detect(t) is set to a value ρ being larger than a maximum value of the Rcv_Power(t). For example, if the number of bits of digital signals treated by the digital-to-analog converter 6 and the analog-to-digital converter 9 are those of 16-bit, the received signal becomes a digital signal of 16-bit. If the number N of a sample calculating the Rcv_Power(t) is represented in N=80 or N=160, the Rcv_Power(t) becomes less than 110 dB or 113 dB. The Rcv_Control 52e may adds the gain value φr based on the volume information output from the Rcv_Int 52a to the value ρ and initialize the Rcv_Detect(t) by using this added value ρ. In this way, the Rcv_Control 52e can detect the receiving section without being affected by overflow.

Since this way does not depend on the magnitude of the power of the received signal at the setting of initialization, Rcv_Control 52e can easily detect the receiving section by the Rcv_Detect(t). The Rcv_Control 52e become easy to detect the section with a large Rcv_Power, so that it can detect the receiving section without being affected by acoustic echoes even if the speech of the far-end user included in the received signal is slightly larger than the acoustic echoes snaked onto the far-end.

More specifically, the Rcv_Control 52e initializes the Rcv_Detect(t) by using the following Equation 7.

When $t=0$, $Rcv\_Detect(t)=\rho+\phi r$ when $States(t-1)=1$ and $States(t)=0$, $Rcv\_Detect(t)=\rho+\phi r$ when States=0 and also $[Snd\_Power(t-1)-Snd\_Detect(t)] \times [Snd\_Power(t)-Snd\_Detector(t)] < 0$, $Rcv\_Detect(t)=\rho+\phi r$ The sending control block composed of a sending gain value storage section (Snd_Int) 52f, a sending lower limit value storage section (Snd_Min) 52g, a sending power calculating section (Snd_Pow) 52h, a sending detection value calculating section (Snd_Det) 52i and a sending detection value control section (Snd_Control) 52j.

The Snd_Int 52f outputs a sending gain value φs being a gain against a sending power value Snd_Power(t) to the Snd_Pow 52h and the Snd_Control 52j on the basis of each mode information output from the control unit 10. Table 4 shows one example of a data table incorporated by the Snd_Int 52f. In the example, Table 4 shown below shows the case that the mode information output from the control unit 10 includes three modes of the mode "0", mode "1" and mode "2" and the case that the data table stores the sending gain value φs corresponding the modes by dB unit. The sending gain value φs may be stored by dB unit or by calculation coefficient unit.

TABLE 4

| | | Sending gain value φs [dB] |
|---|---|---|
| Mode information | 0 | 0 |
| | 1 | 0 |
| | 2 | −11 |

The sending gain value φs is set on the basis of the design of the receiving user volume controller 51 and the level diagram of the analog front-end. The analog front-end includes the digital-to-analog converter 6, the receiving switching circuit 75, the receiving amplifiers 73, 74, the loudspeakers 71, 72, the microphones 81, 82, the sending amplifiers 83, 84, sending switching circuit 85 and the analog-to-digital converter 9.

By this configuration, the communication device can balance the signal power between the received signal and sending signal even if the setting values of the volume controller 51, the receiving amplifiers 73, 74 and the sending amplifiers 83, 84 are set to any value, thereby the ES 52 can be appropriately switch-controlled. Even if the sending power becomes larger than the received power resulting form the setting operations of the volume controller 51 or the design of the level diagram, the receiving state/sending state can be determined correctly at the beginning of the communication start.

Moreover, the setting value which has already balanced in other communication device, in other mode information or other volume information can be used as a reference then the front-end can be easily adjusted. For example, assuming that the mode "0" is the reference, the use of microphones with the same gain and performance in the mode "0" and mode "2" sets the gain of the sending amplifiers in the mode "0" to 29 dB and sets the gain of the sending amplifiers in the mode "2" to 40 dB. The sending gain value φs is set to −11 dB because the sending signal by which the ES 52 calculates the sending power is larger than 11 dB.

The sending gain value φs may be set in advance from outside before the communication starts or may be arbitrarily set thorough the key operations by the user by means of the input device 12. By setting in this way, the user can externally change the priority of the sending signal. Thereby, the user can select the setting so as to give a priority not to send any acoustic echo to the sending signal by eliminating interruption feelings of the received signal or setting so as to give a priority to send the sending signal without any interruption. Accordingly, the user can achieve the switching of the ES 52 in accordance with user's favorite.

Further, the sending gain value φs may be set as the time varying value in which a specified value is added to a gain value based on the mode information output from the control unit. The specified value is set to a value based on the correlation between the received signal and the sending signal at every predetermined period of time (for example, by frame corresponding to processing interval, by speech codec frame, etc.). By setting this way, when there are a lot of acoustic echo in the signal input on the send path, the front-end can enhance the priority of the received signal and prevent the acoustic echo from being sent on the far-end.

The Snd_Min 52g outputs the sending detection lower limit value Snd_Detect_Min being the lower limit value of the sending detection value Snd_Detect(t) to the Snd_Control 52j on the basis of each mode information output from the control unit 10. Table 5 shown below shows one example of a data table incorporated by the Snd_Min 52g. If the mode information output from the control unit 10 includes three modes of the mode "0", mode "1" and mode "2", the data table stores, by dB, the sending detection lower limit value Snd_Detect_Min associated with these modes. The Snd_Detec_Min may be stored by dB or by multiplication coefficient.

TABLE 5

| | | Sending detection lower limit value Snd_Detect_Min [dB] |
|---|---|---|
| Mode information | 0 | +30 |
| | 1 | +59 |
| | 2 | +59 |

The sending detection lower limit value Snd_Detect_Min may be set on the basis of the acoustic coupling amount and the level diagram on the near-end. The received signal output from the near-end is wraparounded onto the near-end sending side, as the acoustic echo. The sending detection lower limit value Snd_Detect_Min is set so as to become larger then the power level of the acoustic echo by actually measuring the power level wraparounded onto the near-end sending side through the near-end or actually measuring the acoustic coupling amount on the near-end. The setting like this can prevent occurrence of the receiving blocking resulting from the acoustic echo which has wraparounded onto the near-end through the near-end.

For example, in the event of the volume value in mode "2" is "3", the gain of the volume controller 51 on the near-end is +5 dB, the gain of the receiving amplifier on the near-end is +7 dB, the acoustic coupling amount of the near-end is −53 dB and the gain of the sending amplifier on the near-end is +40 dB. Since the power level of the acoustic echo included in the sending signal is 59 (=60+5+7−53+40) dB, in comparison with the received signal on the near-end of which the power value being a relatively small volume is 60 dB, the sending detection lower limit value Snd_Detect_Min is set to 59 dB.

The Snd_Pow 52h calculates the Snd_Power(t) being the power of the sending signal input to the ES 52 at every predetermined period of time (for example, by frame corresponding to processing interval, by speech codec frame, etc) on the basis of the sending gain value φs read out from the Snd_Int 52f. The Snd_Power(t) at a certain time t is obtained by calculating the square sum of a sample value y(i) of N samples included in the preset period of time (for example, by frame corresponding to processing interval, by speech codec frame, etc.) at each of the period of time. Where, the Snd_Power(0) at the beginning of the communication (time t=0) is set to 0. Otherwise stated, the Snd_Power(t) at time t is expressed in the following Equation 8.

$$\text{Snd\_Power}(t) = \sum_{i=0}^{N-1} y2(i)$$

or, obtains by dB by performing logarithmic arithmetic for the square sum and multiplying it by 10.

$$\text{Snd\_Power}(t) = 10 \log_{10}\left(\sum_{i=0}^{N-1} y^2(i)\right)$$

Or smoothed signal power may be obtained by averaging the Snd_Power(t) in a plurality of continuous sections.

The Snd_Power(t) calculated as stated above is updated (refer to Equation 9) by adding the receiving gain value φs read out from the Snd_Int 52f at every predetermined period of time (for example, by frame corresponding to processing interval, by speech codec frame, etc.).

$$\text{Snd\_Power}(t) = \text{Snd\_Power}(t) + \phi s$$

further, calculates and updates as the following equation by using a forgetting coefficient λs (0≦λs≦1, for example, λs=0.375–0.999)

$$\text{Snd\_Power}(t) = \text{Max}(\text{Snd\_Power}(t), \lambda s \cdot \text{Snd\_Power}(t-1))$$

Hereinafter, the calculation of the sending power value Snd_Power(t) are going to be explained by calculating logarithm of the sample value and multiplying it by 10 to represent by dB, adding the sending gain value φs read out from the Snd_Int 52f to the value calculated by dB and further using the sending power value Snd_Power(t) using the forgetting coefficient λs. By using the forgetting coefficient λs as mentioned above, the Snd_Int 52f determines that the speech is included in a section longer than that of an original section then it becomes possible to respond to a delay time of an acoustic echo returned back via the far-end, so that the Snd_Int 52f can prevent sending blocking.

The sending power value Snd_Power(t) calculated as mentioned above is respectively output to the Snd_Det 52i, the Snd_Control 52j, the Rcv_Control 52e and the state determining section States 52l.

The Snd_Det 52i calculates the sending detection value Snd_Detect(t) to detect the sending section at every predetermined period of time (for example, by frame corresponding to processing interval, by speech codec frame, etc.) on the basis of the sending power value Snd_Power(t) calculated by the Snd_pow 52h. The sending detection value Snd_Detect(t) is adaptively updated as follows at every predetermined period of time (for example, by frame corresponding to processing interval, by speech codec frame, etc.) on the basis of the sending power value Snd_Power(t) at the current time and the Snd_Detect(t−1) at the time of one preceding period of time. As an example, by using the following conditions: αs≈0.914, βs≈0.086, γ≈0.00002, φs=10 dB, the sending detection value Snd_Detect(t) is represented by the following Equation 10.

When $\text{Snd\_Power}(t)+\phi s < \text{Snd\_Detect}(t-1)$, $\text{Snd\_Detect}(t) = \alpha s \cdot \text{Snd\_Power}(t) + \beta s \cdot \text{Snd\_Detect}(t-1) + \gamma s$ when $\text{Snd\_Power}(t)+\phi s \geq \text{Snd\_Detect}(t-1)$, $\text{Snd\_Detect}(t) = \text{Snd\_Detect}(t-1)$ Where, a constant term γs at the time of the sending detection value calculation may be set on the basis of variance of the noise components included in the sending signal. The variance of the amplitude values of the noise components included in the sending signal may be replaced by using information from the noise suppressor 54. By replacing like this, the Snd_Det 52i can strengthen the sending detection value Snd_Detect(t) against the variations of noises included in the sending signal. The sending detection value Snd_Detect(t) calculated in this manner is output to the Snd_Control 52j.

The Snd_Control 52j controls the sending detection value Snd_Detect(t) output from the Snd_Det 52i at every predetermined period of time (for example, by frame corresponding to processing interval, by speech codec frame, etc).

The Snd_Control 52j, at first, controls as follows so as not to lower the sending detection value Snd_Detect(t) to a level less than the sending detected lower limit value Snd_Detect_Min. Otherwise stated, the Snd_Control 52j determines if the sending detection value Snd_Detect(t) is less than the sending detection lower limit value Snd_Detect_Min read out from the Snd_Min 52g. Resulting from the determination, if the sending detection value Snd_Detect(t) is less than the sanding detection lower limit value Snd_Detect_Min, the Snd_Control 52j updates the sending detection value Snd_Detect(t) to the sending detection lower limit value Snd_Detect_Min. Then, the updated Snd_Detect(t) is output to the state determining section States 52l.

Otherwise stated, the Snd_Control 52j controls the sending detection value Snd_Detect(t) in accordance with the following Equation 11.

When $\text{Snd\_Detect}(t) \geq \text{Snd\_Detect\_Min}$, $\text{Snd\_Detect}(t) = \text{Snd\_Detect}(t)$ when $\text{Snd\_Detect}(t) < \text{Snd\_Detect\_Min}$, $\text{Snd\_Detect}(t) = \text{Snd\_Detect\_Min}$ The Snd_Control 52j increments one by one the sending detection value counter Snd_Detect_Count in the event that the following equation is given in the update processing for the sending detection value Snd_Detect(t) in the Snd_Control 52j.

$\text{Snd\_Power}(t) + \phi s \geq \text{Snd\_Detect}(t-1)$

When the Snd_Detect_Count achieves the preset predetermined value θs, the Snd_Detect_Count is set to 0 and a predetermined value δs is added to the Snd_Detect(t). The predetermined value δs is set so as to be possible to sufficiently follow the variation width of the noise components included in the sending signal and not to react the speech in the sending signal. The predetermined value θs and the predetermined value δs are set to values so as to make the update amount per 1 sec become the degree of 0.1-3.5 dB. More specifically, equations θs=0.2 sec and δs=0.625 dB are given. Thereby, the Snd_Control 52j can prevent the unnecessary long continuation of a state to which a loss is inserted in one path when the sending detection value Snd_Detect(t) has become extremely small or the averaged power during long period of the noise has varied.

Further, the Snd_Control 52j initializes the sending detection value Snd_Detect(t) on the basis of the state information [value of the States(t)] at the beginning of the communication (time t=0) and output from the state determining section States 52l. More specifically, the Snd_Control 52j initializes the sending detection value Snd_Detect(t) at every switching [States(t−1)=0 and States(t)=1] of state information determined by the States 52l from "sending state" to "receiving state". The Snd_Control 52j initializes the sending detection value Snd_Detect(t) in the case that the state information determined by the States 52l is "receiving state [States(t)=1]" and also at every change in the sign of difference between the received power value Rcv_Power(t) and the receiving detection value Rcv_Detect(t) (from plus sign to minus sign or from minus sign to plus sign). By initializing like this, the excessive switching of the ES 52 is prevented. And the state determination becomes hard to be affected by the change of the background noise.

Here, at the time of setting for initialization, the sending detection value Snd_Detect(t) is set to the value ρ being larger than the maximum value of the sending power value Snd_Power(t). For example, if the number of bits of the digital signals treated by the digital-to-analog converter 6 and the analog-to-digital converter 9 is 16-bit, the sending signal becomes a digital signal of 16-bit. The number N of samples to calculate the sending power value Snd_Power(t) is 80 or 160, the sending power value Snd_Power(t) becomes less than 100 dB or 113 dB, the value ρ is set to 150 dB.

The Snd_Control 52j may initialize the sending detection value Snd_Detect(t) by adding the sending gain value φs based on the volume information output from the Snd_Int 52f and by using the value ρ with the sending gain value φs added thereto. By initializing in this way, the sending section is detected without being affected by the overflow. Since the initial setting does not depend on the magnitude of the power of the sending signal, the Send_Control 52j can easily adjust the detection for the sending section by using the sending detection value Snd_Detect(t). Since it becomes easy to detect the section with large sending power value Snd_Power (t), even when the speech of the near-end user included in the sending signal is slightly larger than the acoustic echo snaked to the near-end, the Send_Control 52j can detect the sending section without being affected by the acoustic echo.

In other words, the Send_Control 52j initializes the sending detection value Snd_Detect(t) in accordance with the following Equation 12.

When $t=0$, $Snd\_Detect(t)=\rho+\phi s$ when States($t-1$)=0 and also States($t$)=1, $Snd\_Detect(t)=\rho+\phi s$ when States($t$)=1 and also [Rcv_Power($t-1$)−Rcv_Detect($t$)]×[Rcv_Power($t$)−Ecv_Detect($t$)]<0, $Snd\_Detect(t)=\rho+\phi s$ The main block has a signal loss (attenuation) value storage section Loss 52k and the state determining section States 52l.

The Loss 52k reads out a signal loss value Vs_Loss on the basis of the mode information and the volume information output from the control unit 10 and outputs the information to the States 52l. Table 6 shown below shows an example of a data table provided with the Loss 52k. If there are three modes of the mode "0", mode "1" and mode "2" as the mode information which is output from the control unit 10 and if there are five stages from 1 to 5 for the volume information which is output from the control unit 10, the data table stores, by dB, the signal loss value Vs_Loss associated with these modes and stages. The signal loss value Vs_Loss may be stored by dB or by multiplication coefficient, as shown in the following Table 6.

TABLE 6

| Signal loss value Vs_Loss [dB] | | Volume information | | | | |
|---|---|---|---|---|---|---|
| | | 1 | 2 | 3 | 4 | 5 |
| Mode information | 0 | +0 | +0 | +0 | +9 | +9 |
| | 1 | +5 | +10 | +15 | +20 | +25 |
| | 2 | +35 | +39 | +43 | +47 | +51 |

The States 52l reads out the signal loss value Vs_Loss from the Loss 52k and decides the state information [value of the States(t)] at every predetermined period of time (for example, by frame corresponding to processing interval, by speech codec frame, etc.). The decision of the state information [value of the States(t)] is conducted on the basis of the received power value Rcv_Power(t) to be output from the Rcv_Pow 52c, the receiving detection value Rcv_Detect(t) to be output from the Rcv_Control 52e, the sending power value Snd_Power(t) being output from the Snd_Pow 52h and the sending detection value Snd_Detect(t) being output from the Snd_Control 52j.

The States 52l also decides a received signal loss value Rcv_Loss(t) being the insertion loss amount to a received signal attenuating section 52m and a sending signal loss value Snd_Loss(t) being an insertion loss amount to a sending signal attenuating section 52n, respectively.

The States 52l controls the received signal attenuating section 52m and the sending signal attenuating section 52n on the basis of the result of the determination.

The States 52l makes the state information be "receiving state [States(0)=1]" at the beginning of the communication (time t=0). The States 52l may make the state information be "sending state [States(0)=0]" at the beginning of communication (time t=0).

Moreover, if the state information is "sending state [States (t−1)=0]", if the following equation:

$Rcv\_Power>Rcv\_Detect(t)$ and $Rcv\_Power(t)>Snd\_Power(t)+\epsilon$ is held, the States 52l switches the state information to "receiving state [States(t)=1]".

In contrast, if the state information is "receiving state [States(t−1)=1]", and if the following equation:

$Snd\_Power(t)>Snd\_Detect(t)$ and $Snd\_Power(t)>Rcv\_Power(t)+\zeta$ is held, the States 52l switches the state information to "sending state [States(t)=0]".

In the above described determination process of the state information, "Delay" is used as a delay time of the acoustic echo from the near-end receiving side to the near-end sending side and a previous received signal Rcv_Detect(t-Delay) may be used. By the determination process as described above, the receiving blocking caused by the acoustic echo snaked to the near-end sending side through the near-end receiving side can be prevented.

The hysteresis $\epsilon$ and $\zeta$ are specifically set to 26 dB and −4 dB, respectively. Here, hysteresis $\epsilon$ and $\zeta$ may be variable on the basis of the volume information, received power value, sending power value, receiving detection value and sending detection value. For example, if the difference between the received power value and the receiving detection value is small, the corresponding hysteresis is increased, if the difference between the sending power value and the sending detection value is small, the corresponding hysteresis is increased and if the volume based on the volume information is large, the corresponding hysteresis is increased. Owing to such variations, the state is hardly varied if both power of the received signal and the sending signal are small. The state also becomes hard to be varied if the difference between the received signal and the sending signal is small. Consequently, the ES 52 can be hardly switched excessively.

It is possible to have a timer to count the time period in which the same state is continued and to variably set the count time of the timer on the basis of the volume information, received power value, sending power value, receiving detection value and sending detection value. For example, in the case that the difference between the received power value and the receiving detection value is small, the count time of the timer may be set long, and in the case that the volume based on the volume information is large, the cont time of the timer may be set long. By setting as mentioned above, if both received signal and the sending signal are small in power, it is possible for the state to be varied, and if the difference between the power of the received signal and the sending signal is small, it is possible for the state to be hardly varied. As a result, the ES 52 is not switched excessively.

The States 52*l* further includes a signal loss value counter Vs_Count. If the state information is varied from "sending state [States(t−1)=0]" to "receiving state [States(t)=1]", the signal loss value counter Vs_Count subtracts until the value of the sending signal loss value Snd_Loss(t) reaches reach 0 step by step by a specified value K. Thereby, the received signal loss value Rcv_Loss(t) smoothly increases step by step. Similarly, If the state information is varied from "receiving state [States(t−1)=1]" to "receiving state [States(t)=0]", the signal loss value counter Vs_Count subtracts until the value of the received signal loss value Rcv_Loss (t) reaches 0 step by step by a specified value κ. Thereby, the sending signal loss value Snd_Loss(t) is smoothly increased step by step.

In these processes, the sum of the received signal loss value Rcv_loss(t) and the sending signal loss value Snd_loss(t) is made as to become a signal loss value Vs_Loss being read out from the Loss 52*k*. In this case, the specified value κ is one which is set on the basis of the signal loss value Vs_Loss being read out from the Loss 52*k*.

By smoothly varying the received signal loss value Rcv_Loss(t) and the sending signal loss value Snd_Loss(t) step by step, interruption feelings of a top of a word and an end of a word can be reduced. Hereinafter, the operations of the States 52*l* will be explained by assuming that the received signal loss value Rcv_Loss(t) and the sending signal loss value Snd_Loss(t) is varied step by step by multiplying 0.3 sec resulting from setting of Vs_Count=0.1 sec and κ=Vs_Loss÷3 dB.

The States 52*l* outputs the determined state information to the Rcv_Control 52*e* and the Snd_Control 52*j* and induces initialization and control of the receiving detection value Rcv_Detect(t) and the sending detection value Snd_Detect (t).

The received signal attenuating section 52*m* attenuates the signal by inserting the loss (attenuated value) into the received signal on the basis of the received signal loss value Rcv_loss(t) to be output from the States 52*l* and outputs the attenuated signal.

The sending signal attenuating section 52*n* attenuates the signal by inserting a loss into the sending signal on the basis of the sending signal loss value Snd_loss(t) and outputs the attenuated signal.

Among each constituent component of the above-mentioned echo suppressor (ES) 52, each function of the sending control block, the receiving control block and the main control block are achieved by a digital signal processor (DSP), etc.

Next, the operations of the ES 52 configured as described above will be explained. FIGS. 4-16 are flowcharts showing its operation procedures and operation contents.

Figure 5:
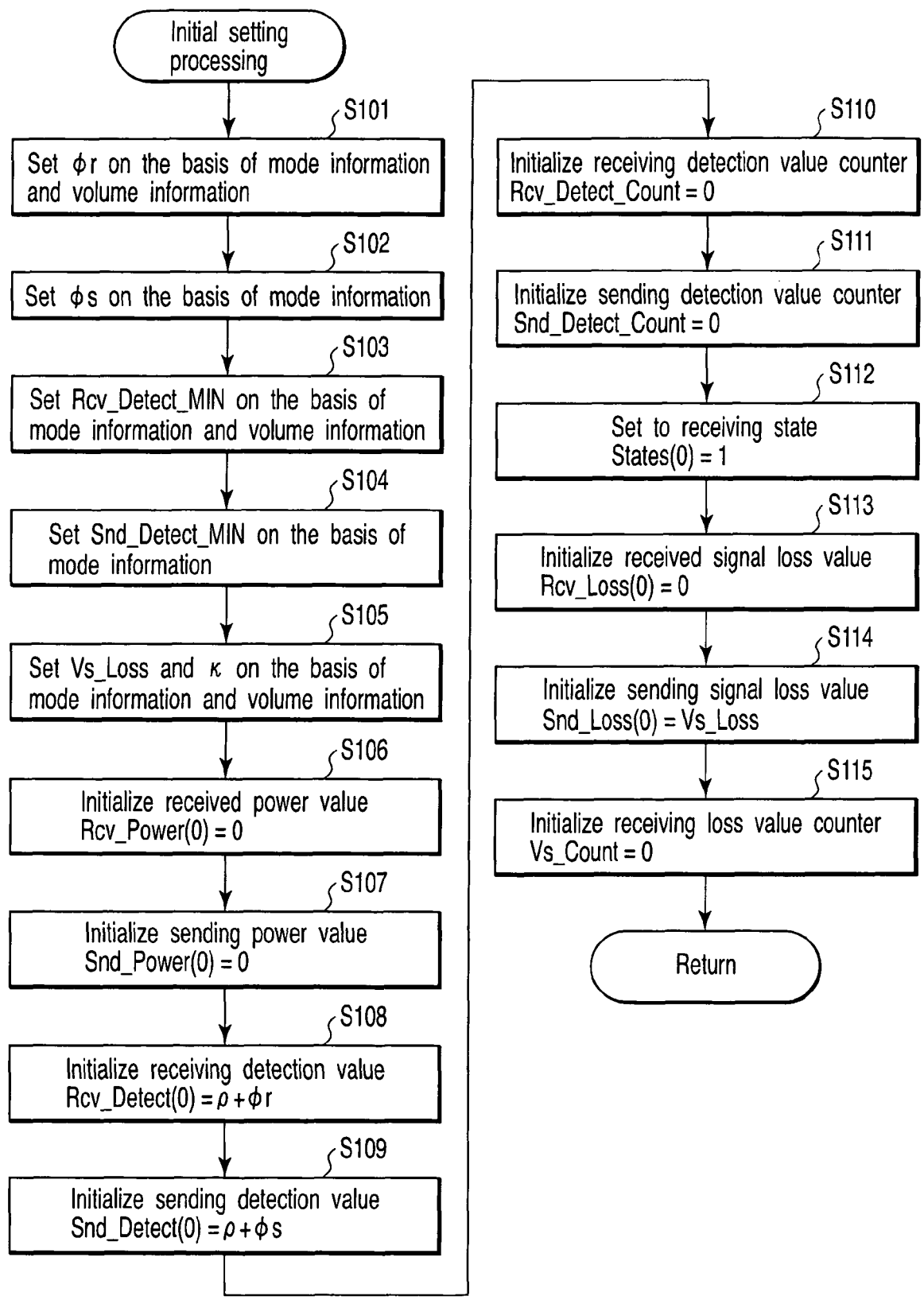
FIG. 5 is a flowchart showing procedures and contents of initial setting processing in the control procedures shown in FIG. 4.

When an outgoing call or an incoming call is made in a standby state, the ES 52 conducts initial setting processing as mentioned below in accordance with an instruction from the control unit 10 (step S1). FIG. 5 is a flowchart showing the contents of the initial setting processing.

At first, the ES 52 selectively reads out the receiving gain value φr corresponding to a mode and a volume from the Rcv_Int 52*a* in response to the mode information and the volume information provided from the control unit 10 (step S101). The ES 52 selectively reads out the sending gain value φs corresponding to the mode from the sending gain value storage section Snd_Int 52*f* in response to the mode information provided from the control unit 10 (step S102).

Subsequently, the ES 52 selectively reads out the receiving detection lower limit value Rcv_Detect_Min corresponding to a mode and a volume from the Rcv_Min 52*b* in response to the mode information and the volume information provided from the control unit 10 (step S103). The ES 52 selectively reads out the sending detection lower limit value Snd_Detect_Min corresponding to the mode from the sending lower limit value storage section Snd_Min 52*g* in response to the mode information provided from the control unit 10 (step S104).

The ES 52 selectively reads out the signal loss value Vs_loss corresponding to the mode and the volume from the signal loss value storage section (Loss) 52*k* in response to the mode information and the volume information provided from the control unit 10. And the ES 52 sets the constant value, for example κ=Vs_loss÷3 on the basis of the signal loss value Vs_Loss being read out from the Loss 52*k* (step S105).

The ES 52 initializes the received power value Rcv_Power (0) of the received power calculating section (Rcv_Pow) 52*c* and the sending power value Snd_Power(0) of the sending power calculating section (Snd_Pow) 52*h*, respectively in steps S106, S107.

The ES 52 initializes the receiving detection value Rcv_Detect(0) of the receiving detection value calculating section (Rcv_Det) 52*d* and the sending detection value Snd_Detect (0) of the sending detection value section (Snd_Det) 52*i* in steps S108, S109, respectively.

These initialization are conducted by adding the receiving gain value Or stored in the receiving gain value storage section Rcv_Int 52*a* and the sending gain value φs stored in the sending gain value storage section Snd_Int 52*f* to the value ρ which has set to a value larger than a logical maximum value of the received power value Rcv_Power(t) and the sending power value Snd_Power(t).

The ES 52 initializes the receiving detection value counter Rcv_Detect_Count (step S110). The receiving detection value counter Rcv_Detect_Count counts the continuous time period in the state in which the receiving detection value Rcv_Detect(t) is less than a received power value Rcv_Power (t)+φr in the Rcv_Control 52*e*. The ES 52 also initializes the sending detection value counter Snd_Detect_Count (step S111). The Snd_Detect_Count counts the continuous time period in the state in which the sending detection value Snd_Detect(t) is not more than a sending power value Snd_Power (t)+φs in the Snd_Control 52*j* (step S111). The ES 52 sets the initial state of the state determining section (States) 52*l* to "receiving state", namely States(0)=1 (step S112).

The ES 52 initializes the received signal loss value Rcv_loss(0) of the received signal attenuating section 52*m* and the sending signal loss value Snd_Loss(0) to the Vs_Loss which is read out from the Loss 52 in steps S113, S114, respectively. At last, the ES 52 initializes the signal loss value counter Vs_Count to 0 (step S115). The signal loss value counter Vs_Count counts a variation time period to smoothly increasing/decreasing the received signal loss value Rcv_loss(t) and the sending signal loss value Snd_Loss(t) in the States 52*l*.

Figure 6:
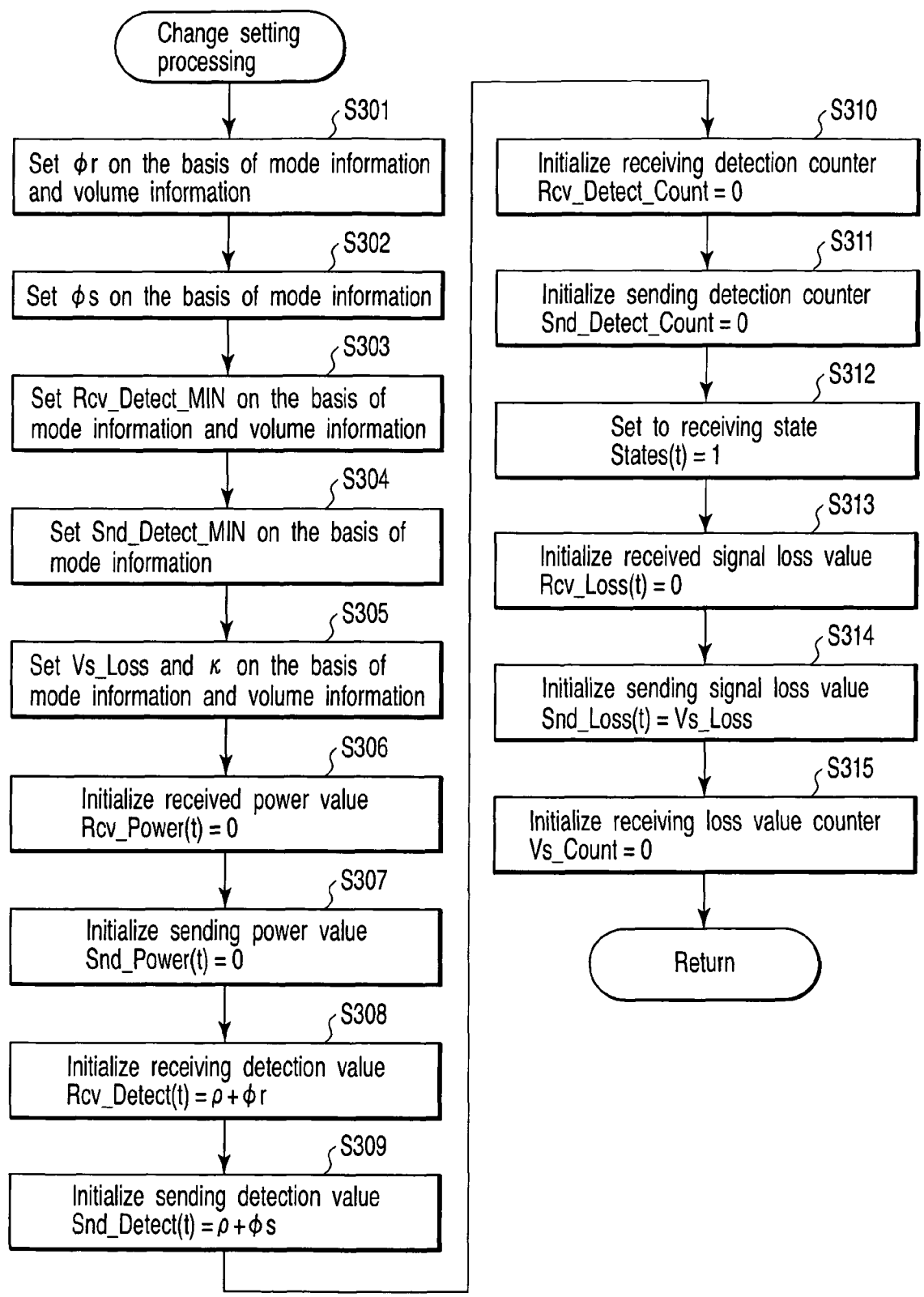
FIG. 6 is a flowchart showing procedures and contents of change setting processing in the control procedures shown in FIG. 4.

When interactive communication starts after completing the above-mentioned initial setting processing, the ES 52 sets the start time t as t=0. The ES 52 monitors variations of the mode information and the volume information at every predetermined period of time (for example by frame corresponding to processing interval, by speech codec frame, etc.) (step S2). When the variations of the mode information and the volume information are detected, then the ES 52 shifts to step S3 and conducts variation setting processing as described below, in response to the mode information and the volume information provided from the control unit 10. FIG. 6 is a flowchart showing the processing procedures and the processing contents.

At first, the ES 52 selectively reads out the receiving gain value φr corresponding to a mode and a volume from the Rcv_Int 52*a* in response to the mode information and the volume information provided the control unit 10 (step S301). The ES 52 selectively reads out the sending gain value φs corresponding to the mode from the Snd_Int 52*f* in response to the mode information provided from the control unit 10 (step S302).

The ES 52 selectively reads out the receiving detection lower limit value Rcv_Detect_Min corresponding to the mode and the volume from the Rcv_Min 52*b* in response to the mode information and the volume information provided from the control unit 10 (step S303). The ES 52 selectively reads out the sending detection lower limit value Snd_Detect_Min corresponding to the mode from the Snd_Min 52*g* in response to the mode information provided from the control unit 10 (step S304).

The ES 52 selectively reads out the signal loss value Vs_Loss corresponding to the mode and the volume from the Loss 52*k* in response to the mode information and the volume information provided from the control unit 10 (step S305). The ES 52 sets the value, as like, for example the equation, κ=Vs_Loss÷3 on the basis of the signal loss value Vs_Loss being read out from the Loss 52*k*.

Subsequently, the ES 52 initializes the received power value Rcv_Power(t) of the Rcv_Pow 52*c* and the sending power value Snd_Power(t) of the Snd_Pow 52*h* to 0 in steps S306, S307, respectively.

The ES 52 initializes the receiving detection value Rcv_Detect(t) of the Rcv_Det 52*d* and the sending detection value Snd_Detect(t) of the Snd_Det 52*i* in steps S308, S309, respectively. This initialization is conducted by adding the receiving gain value φr stored in the Rcv_Int 52*a* and the sending detection value φs stored in the Snd_Int 52*f* to the value ρ which has set to the value larger than the logical maximum values of the received power value Rcv_Power(t) and the sending power value Snd_Power(t).

The ES 52 initializes the receiving detection value counter Rcv_Detect_Count (step S310). The receiving detection value counter Rcv_Detect_Count counts the continuous time period of the state in which the receiving detection value Rcv_Detect(t) is not more than the received power value Rcv_Power(t)+φr in the Rcv_Control 52*e* (step S310). The ES 52 also initializes the sending detection value counter Snd_Detect_Count (step S311). The sending detection value counter Snd_Detect_Count counts the continuous time period of the state in which the sending detection value Snd_Detect(t) is not more than the sending power value Snd_Power(t)+φs in the Snd_Control 52*j*. The ES 52 sets the initial state in the States 52*l* to "receiving state", namely States(t)=1 (step S312).

The ES 52 initializes the received signal loss value Rcv_Loss(t) of the received signal attenuating section 52*m* to 0 (step S313), and initializes the sending signal loss value Snd_Loss(t) of the sending signal attenuating section 52*n* to the signal loss value Vs_Loss to be read out from the Loss 52*k* (step S314). At last, the ES 52 initializes the signal loss value counter Vs_Count to 0 (step S315). The signal loss value counter Vs_Count counts the variation time period to smoothly increase/decrease the received signal loss value Rcv_Loss(t) and the sending signal loss value Snd_Loss(t) in the States 52*l*.

Figure 7:
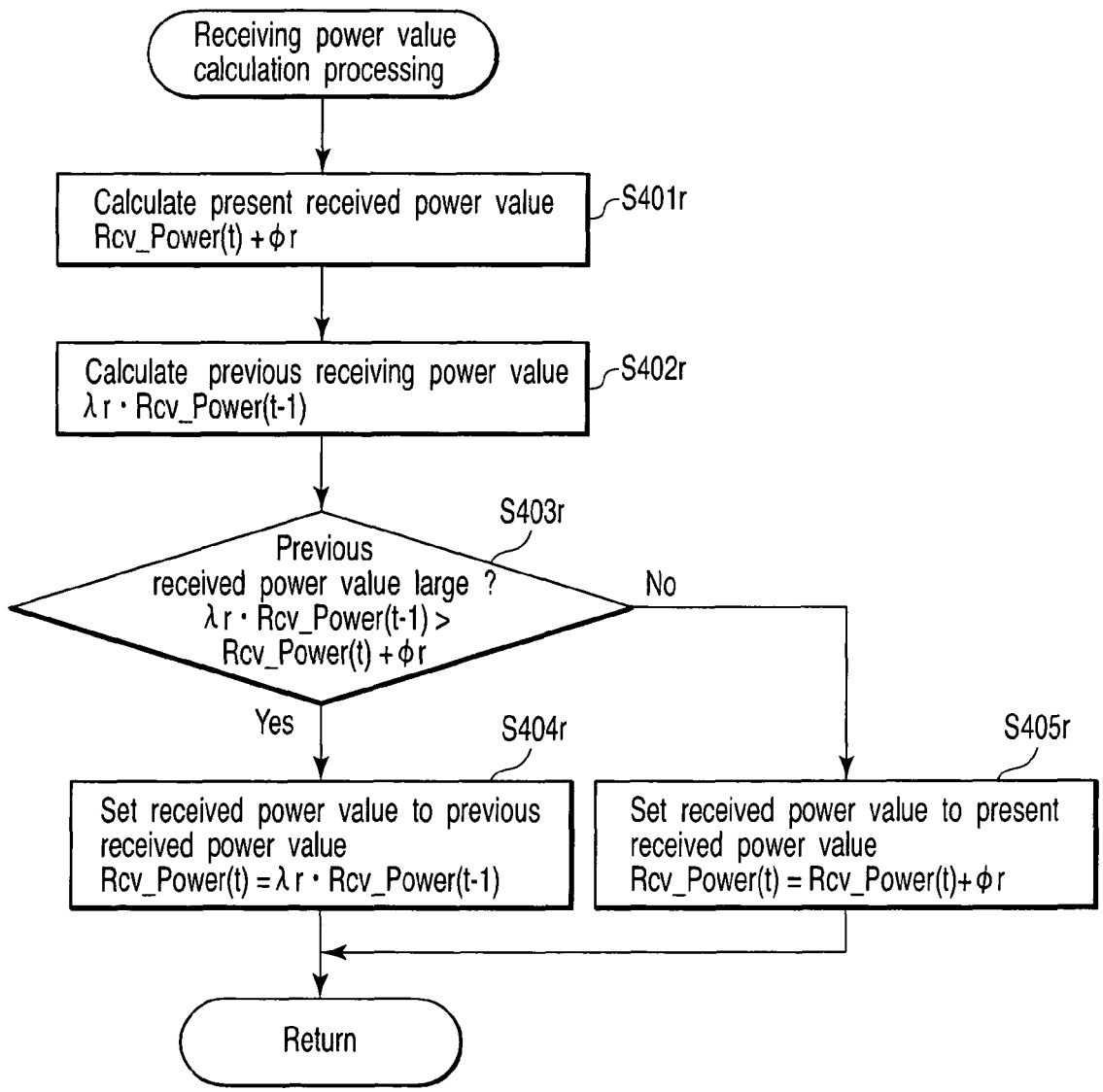
FIG. 7 is a flowchart showing procedures and contents of received power calculation processing in the control procedures shown in FIG. 4.
Figure 8:
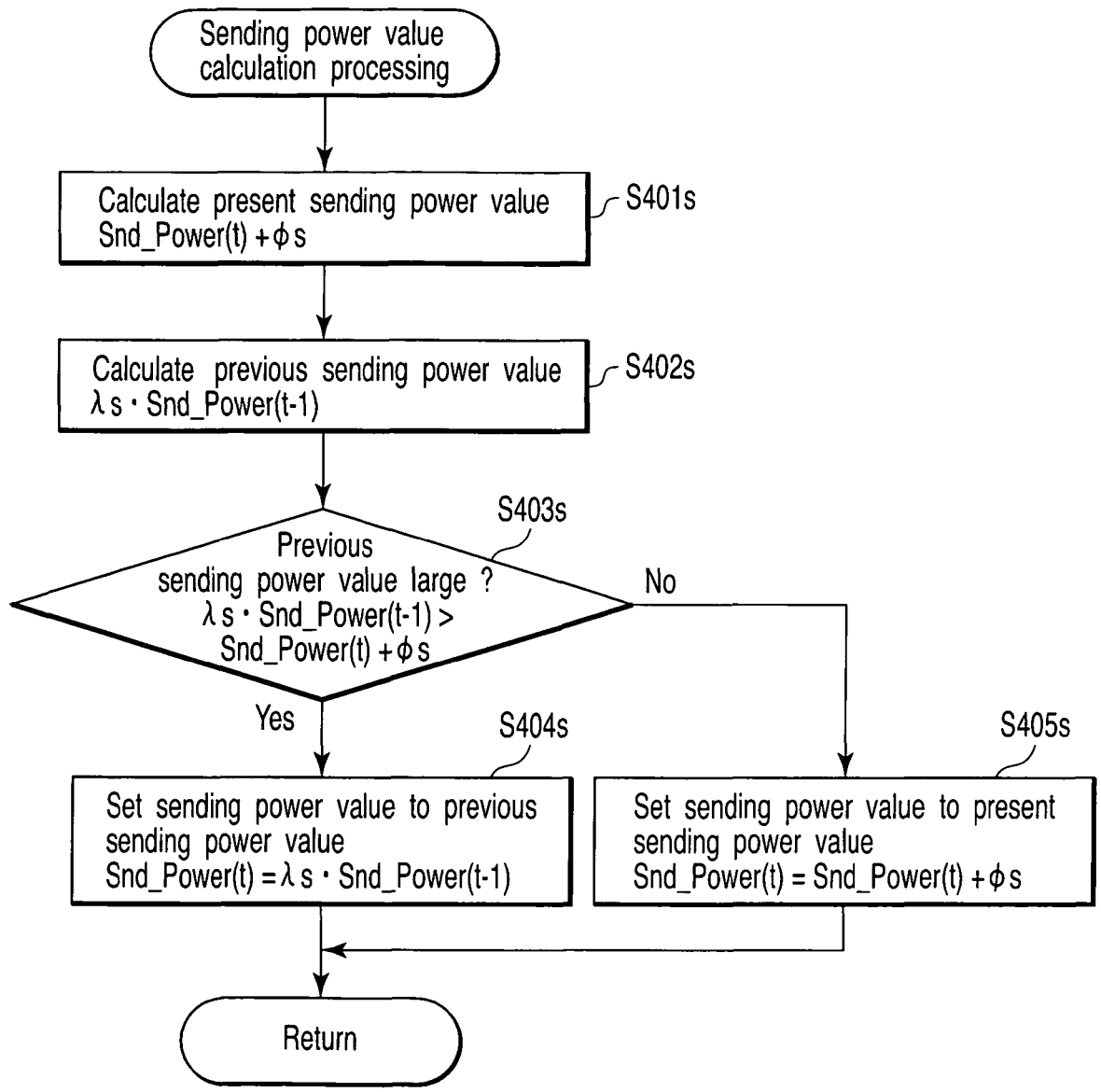
FIG. 8 is a flowchart showing procedures and contents of sending power calculation processing in the control procedures shown in FIG. 4.

The ES 52 shifts to a step S4*r* and a step S4*s* during the interactive communication. The ES 52 conducts calculation processing of the received power value Rcv_Power(t) by the Rcv_Pow 52*c* (step S4*r*). The ES 52 conducts the calculation processing of the sending power value Snd_Power(t) by the Snd_Pow 52*h* (step S4*s*). FIG. 7 is a flowchart showing processing procedures and processing contents for the received power value Rcv_Power(t), and FIG. 8 is a flowchart showing processing procedures and processing contents for the sending power value Snd_Power(t).

Otherwise stated, at the time of calculation of the received power value Rcv_Power(t), at first, the ES 52 calculates the present received power value (step S401*r*). This calculation of the present received power value is conducted by obtaining the received power value Rcv_Power(t) by calculating, at every period of time, the square sum of the sample values included in the preset period of time (for example by frame corresponding to processing interval, by speech codec frame, etc.) and by adding the receiving gain value φr which is read out from the Rcv_Int 52*a* to the received power value Rcv_Power(t), namely by calculating the Rcv_Power(t)+φr (step S401*r*). Subsequently, the ES 52 calculates the previous received power former by one period of time (step S402*r*). This previous received power value is calculated as a λr×Rcv_Power(t−1) by using the forgetting coefficient λr (0≦λr≦1).

The ES 52 determines whether or not the following equation is given Rcv_Power(t−1)>Rcv_Power+φr in comparison the calculated previous received power value λr×Rcv_Power(t−1) to the present received power value Rcv_Power(t), namely whether or not the previous received power value is larger than the present one (step S403*r*). As the result of the determination, if the previous received power value is larger than the present one, the ES 52 selects the previous received power λr×Rcv_Power(t−1) (step S404*r*). In contrast, if the previous received power λr×Rcv_Power(t−1) is smaller than the present one, the ES 52 selects the present received power value Rcv_Power+φr (step S405*r*). That is, the ES 52 always selects a larger received power value, thereby the peak of the received power is detected.

On the other hand, at the time of calculation of the sending power value Snd_Power(t), like the calculation of the received power value as described above, the ES 52 calculates the present sending power value Snd_Power(t)+φs (step S401*s*) then calculates the previous sending power value λs×Snd_Power(t−1) by using the forgetting coefficient λs (0≦λs≦1) (step S402*s*). The ES 52 determines whether or not the previous sending power value is larger in comparison the calculated previous sending power value λs×Snd_Power (t−1) to the present sending power value Snd_Power(t)+φs (step S403s). As the result of the determination, if the previous sending power value is larger than the present one, the ES 52 selects the previous sending power value λs×Snd_Power (t−1) (step S404s). In contrast, if the previous sending power value is smaller than the present one, the ES 52 selects the present sending power value Snd_Power(t)+φs (step S405s). That is, the peak of the sending power value is detected.

Figure 9:
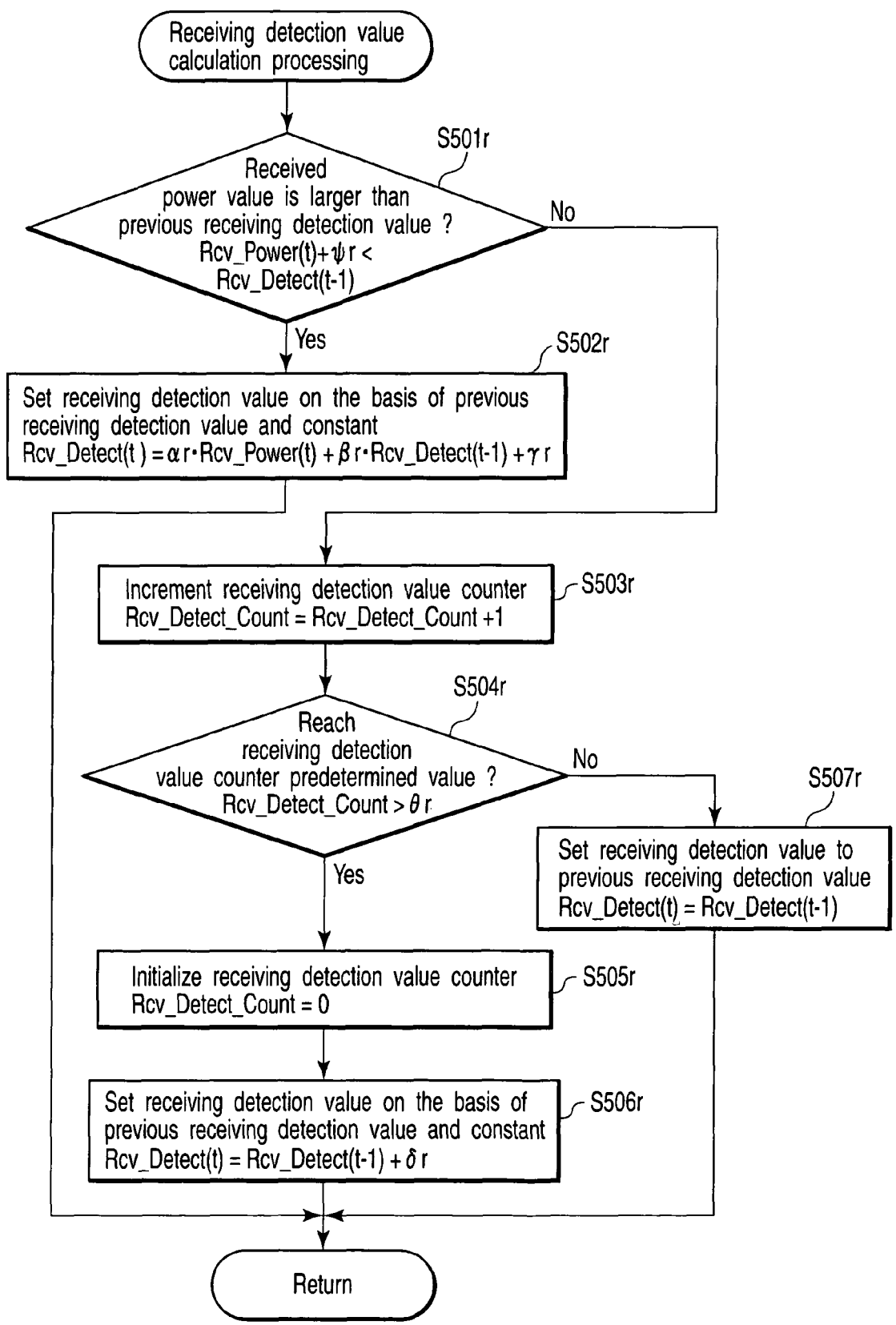
FIG. 9 is a flowchart showing procedures and contents of receiving detection value calculation processing in the control procedures shown in FIG. 4.
Figure 10:
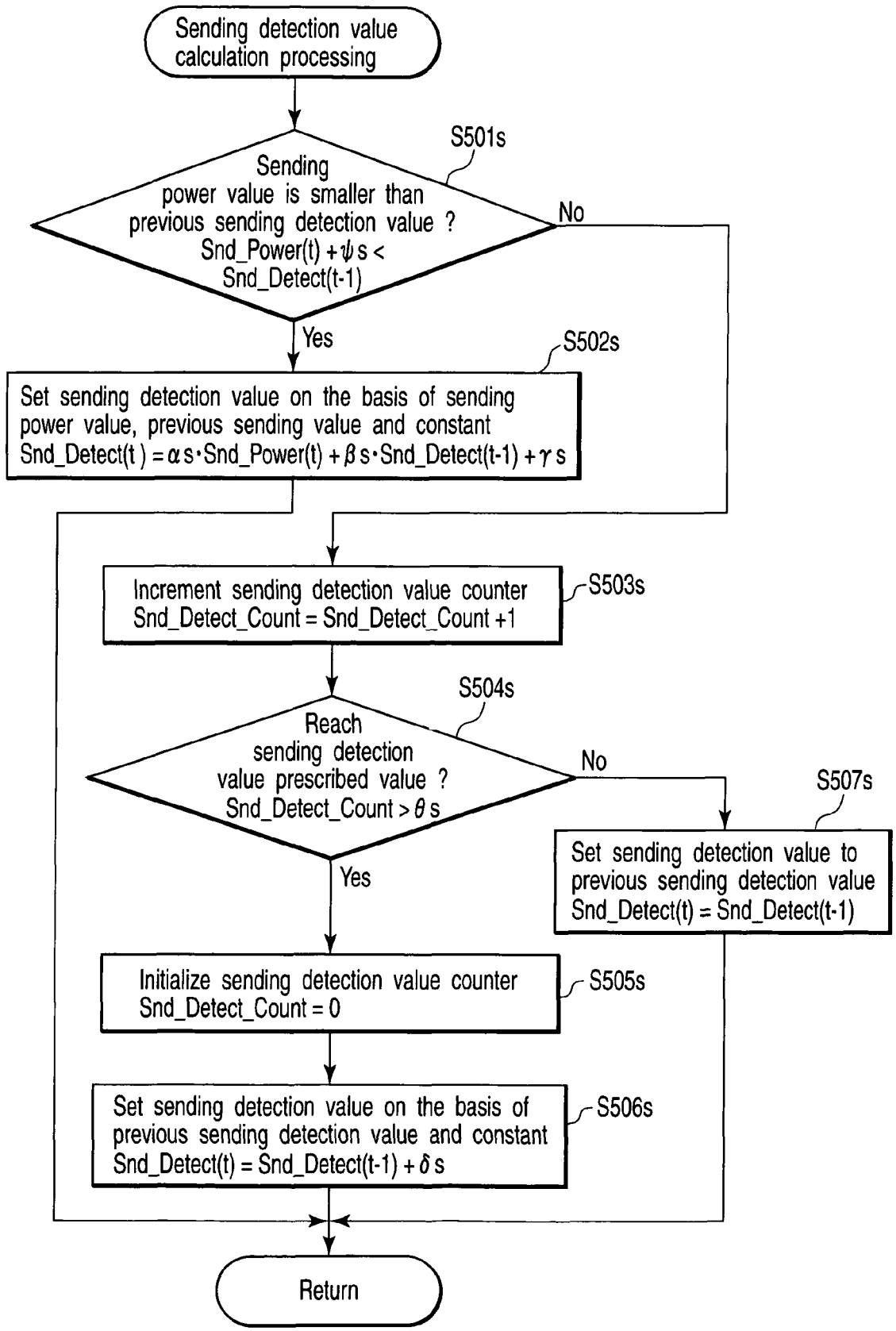
FIG. 10 is a flowchart showing procedures and contents of sending detection value calculation processing in the control procedures shown in FIG. 4.

The ES 52 shifts to a step S5r and step S5s after calculating the received power value Rcv_Powert(t) and the sending power value Snd_Power(t), then, calculates the receiving detection value Rcv_Detect(t) and the sending detection value Snd_Detect(t) as described below by the Rcv_Det 52d and the Snd_Det 52i, respectively. FIG. 9 and FIG. 10 are flowcharts respectively showing processing procedures and processing contents.

In the calculation of the receiving detection value, at first, the ES 52 compares the calculated received power value Rcv_Power(t)+φr with the previous receiving detection value Rcv_Detect(t−1), thereby it is determined that the following equation:

$$Rcv\_Power(t)+\phi r < Rcv\_Detect(t-1).$$

is given or not (step S501r). As the result of the determination, if the above described equation is given, the ES 52 shifts to a step S502r then calculates new receiving detection value Rcv_Detect(t) by using the received power value Rcv_Power (t), the previous receiving detection value Rcv_Detect(t−1) and constants αr, βr and γr. This calculation is executed by the following Equation 13.

$$Rcv\_Detect(t)=\alpha r \cdot Rcv\_Power(t)+\beta r \cdot Rcv\_Detect(t-1)+ \gamma r$$

In contrast, assuming that Rcv_Power(t)+φr≧Rcv_Detect (t−1), in this case, the ES 52 shifts to a step S503r and increments the receiving detection value counter Rcv_Detect_Count in the Rcv_Control 52e. Namely, the equation Rcv_Detect_Count=Rcv_Detect_Count+1 is held. Then, the ES 52 determines whether or not the receiving detection value counter Rcv_Detect_count has reached the predetermined value θr in the Rcv_Control 52e (step S504r). As the result of the determination, the equation of Rcv_Detect Count>θr is not held, the ES 52 shifts to a step S507r. Then, the ES 52 sets a new receiving detection value Rcv_Detect(t) to the previous receiving detection value Rcv_Detect(t−1).

In contrast, it is assumed that the equation of Rcv_Detect_Count>θr is held in the step S504r, then the Rcv_Control 52e initializes (Rcv_Detect_Count=0) the receiving detection value counter Rcv_Detect_Count (step S505r), and calculates a new receiving detection value Rcv_ Detect (t) by using the previous receiving detection value Rcv_Detect(t−1) and a positive predetermined value δr (step S506r). The new receiving detection value Rcv_Detect(t) is calculated by the following equation:

$$Rcv\_Detect(t)=Rcv\_Detect(t-1)+\delta r.$$

On the other hand, in the calculation of the sending detection value, like the calculation processing of the foregoing receiving detection value, in a step S501s, the Snd_Det 52i compares the calculated sending power value Snd_Power(t)+φs to the previous the sending detection value Snd_Detect(t−1), thereby determines whether or not the following relation Snd_Power(t)+φ<Snd_Detect(t−1) is given. As a result, if this equation is given, by using the constants αs, βs and γs and the following Equation 14, the Snd_Det 52i calculates a new sending detection value Snd_Detect(t) in a step S502s.

$$Snd\_Detect(t)=\alpha s \cdot Snd\_Power(t)+\beta s \cdot Snd\_Detect(t-1)+ \gamma s$$

In contrast, it is assumed that the equation Snd_Power(t)+ φs≧Snd_Detect(t−1) is given. The ES 52 shifts to a step S503s then the Snd_Control 52j increments the sending detection value counter Snd_Detect_Count. The ES 52 determines if the incremented sending detection counter Snd_Detet_Count has reached the predetermined value θs (Step S504s).

As a result, if the equation Snd_Detect_Count>θs is not satisfied, the ES 52 shifts to a step S507s and sets the new sending detection value Snd_Detect_Count(t) to the previous sending detection value Snd_Detect(t−1). In contrast, in the step S504s, the equation Snd_Detect_count>θs is satisfied, the Snd_Control 52j initializes (Snd_Detect Count=0) the sending detection value counter Snd_Detect_Count (step S505s). The Snd_Control 52j calculates a new sending detection value Snd_Detect(t) by using the previous detection value Snd_Detect(t−1) and the positive predetermined value δs (step S506s). The new sending detection value is calculated by the following equation:

$$Snd\_Detect(t)=Snd\_Detect(t-1)+\delta s.$$

The ES 52 shifts to a step S6r and a step S6s after calculating the received detection value Rcv_Detect(t) and the sending detection value Snd_Detect(t) then the Rcv_Control 52e and the Sen_Control 52j conducts the control processing for the receiving detection value Rcv_Detect(t) and the sending detection value Snd_Detrect(t), respectively as follows.

Figure 11:
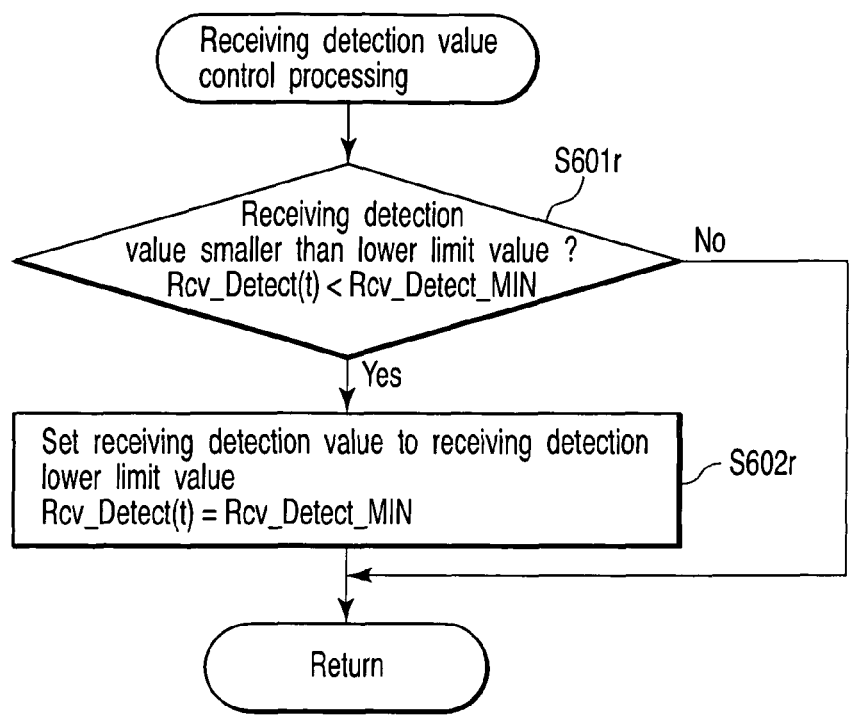
FIG. 11 is a flowchart showing procedures and contents of receiving detection value control processing in the control procedures shown in FIG. 4.
Figure 12:
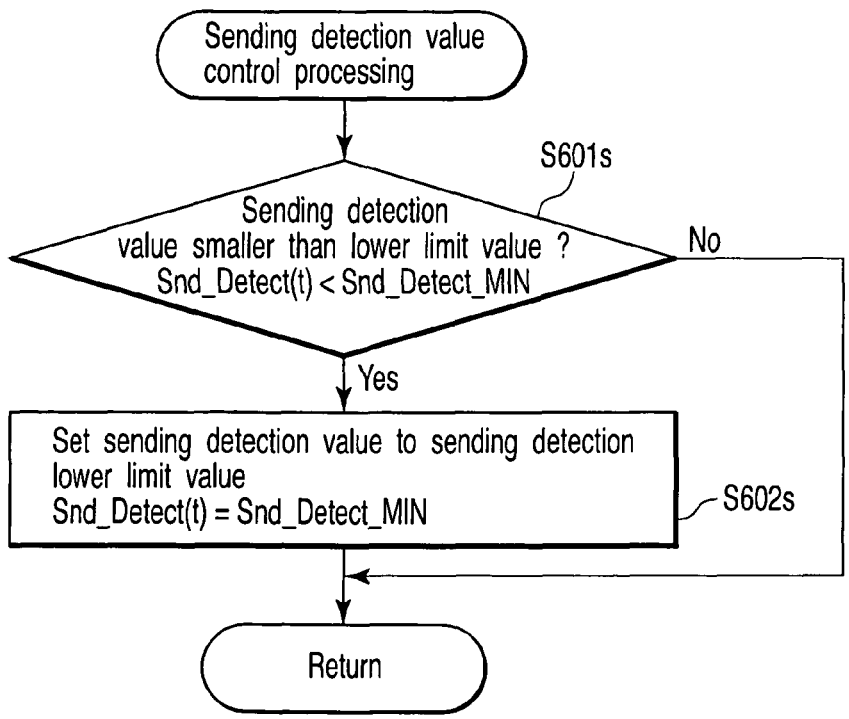
FIG. 12 is a flowchart showing procedures and contents of sending detection value control processing in the control procedures shown in FIG. 4.

FIG. 11 is a flowchart showing processing procedures and contents in the Rcv_Control 52e, and FIG. 12 in a flowchart showing processing procedures and contents in the sending detection value Snd_Control 52j.

Otherwise stated, at first, the Rcv_Control 52e compares the calculated receiving detection value Rcv_Detect(t) with the receiving detection lower limit value Rcv_Detect_Min being read out from the Rcv_Min 52b, then, determines whether or not the equation Rcv_Detect(t)<Rcv_Detect_Min is satisfied. Namely, the Rcv_Control 52e determines whether the calculated receiving detection value Rcv_Detect (t) is smaller than the receiving detection lower limit value Rcv_Detect_Min or not (step S601r). As the result of the determination, if the calculated receiving detection value Rcv_Detect(t) is smaller than the receiving detection lower limit value Rcv_Detect_Min, the Rcv_Control 52e sets the receiving detection value Rcv_Detect(t) to the receiving detection lower limit value Rcv_Detect_Min (step S602r). In contrast, if the calculated receiving detection value Rcv_Detect(t) is equal to or larger than the receiving detection lower limit value Rcv_Detect_Min, the Rcv_Control 52e maintains the receiving detection value Rcv_Detect(t) as it is.

On the other hand, in the control processing in the Snd_ Control 52j, similar to the control processing in the Rcv_Control 52e, the Snd_Control 52j compares the calculated sending detection value Snd_Detect(t) with the sending detection lower limit value Snd_Detect_Min being read out from the Snd_Min 52g and determines that whether or not the calculated sending detection value Snd_Detect(t) is smaller than the sending detection lower limit value Snd_Detect_Min (step S601s). As the result of the determination, if the calculated sending detection value Snd_Detect(t) is smaller than the sending detection lower limit value Snd_Detect_Min, the Snd_Control 52j sets the sending detection value Snd_Detect (t) to the sending detection lower limit value Snd_Detect_

Min (step S602s). In contrast, the calculated sending detection value Snd_Detect(t) is not less than the sending detection lower limit value Snd_Detec_Min, the Snd_Conrrol 52j maintains the sending detection value Snd_Detect(t) as it is.

Figure 4:
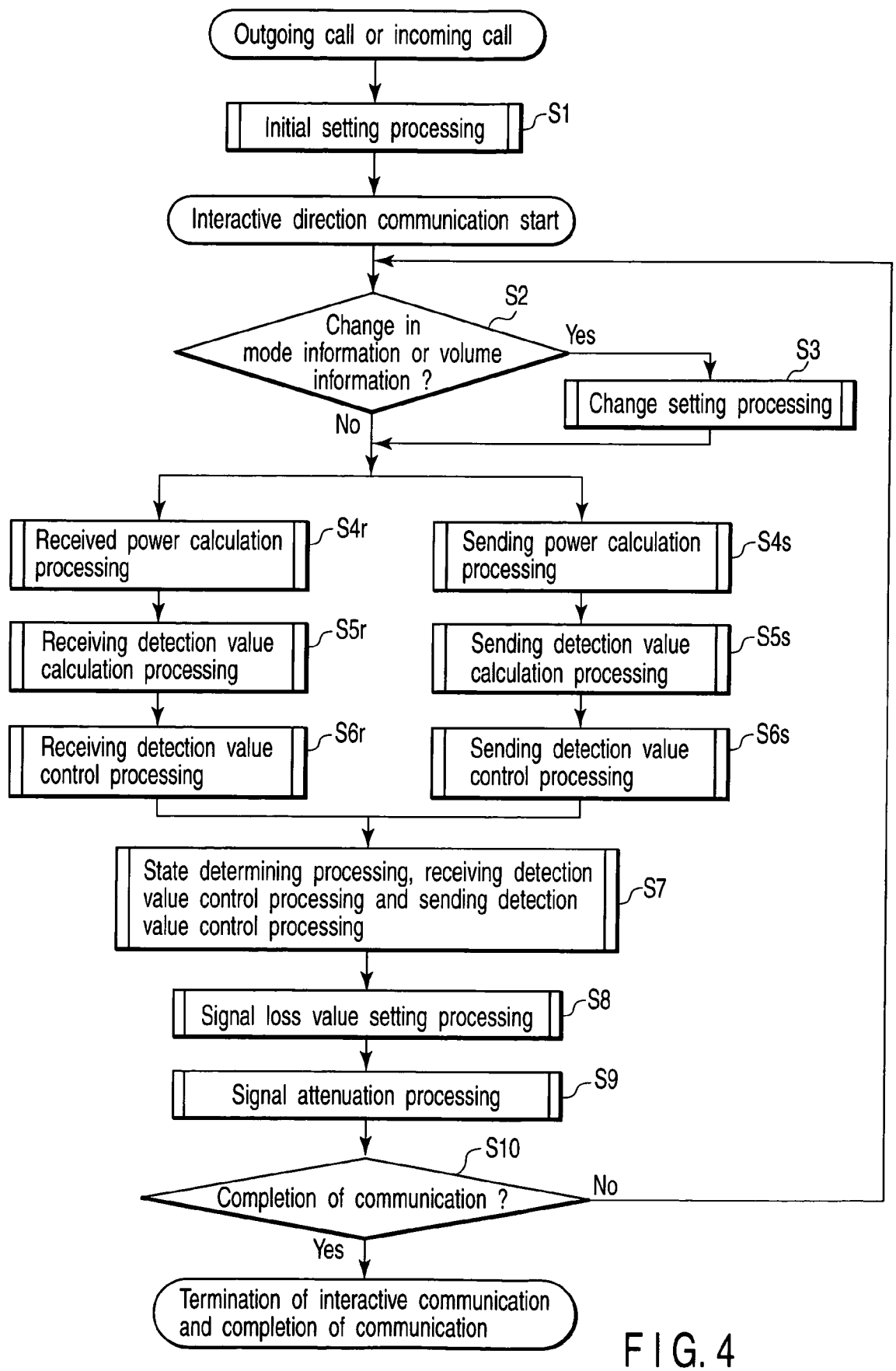
FIG. 4 is a flowchart showing control procedures and control contents of the echo suppressor and a control unit shown in FIG. 3.
Figure 13:
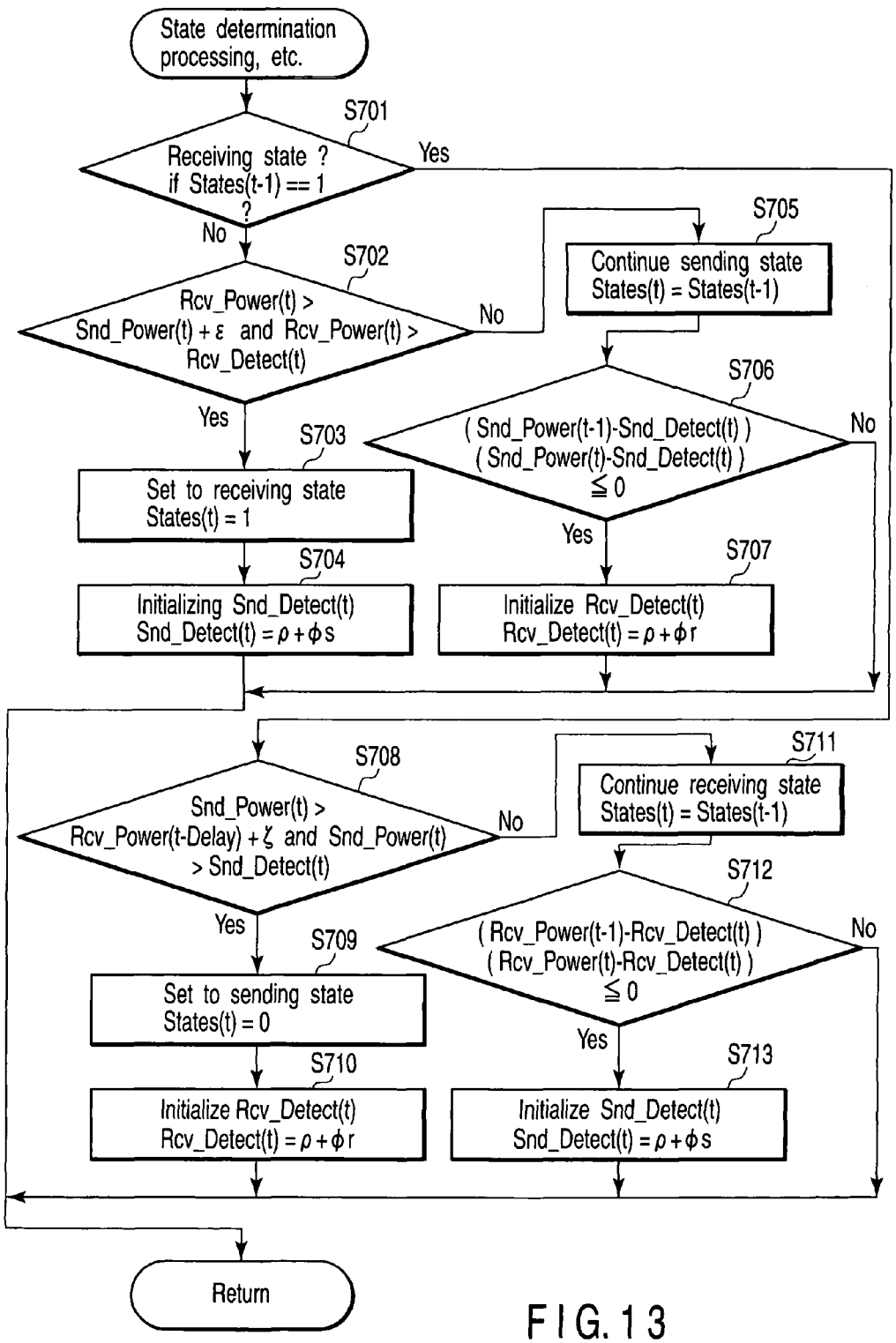
FIG. 13 is a flowchart showing procedures and contents of state determination processing, receiving detection value control processing and sending detection value control processing in the control procedures shown in FIG. 4.

After calculating the received power value Rcv_Power(t), the receiving detection value Rcv_Detct(t), the sending power value Snd_Power(t) and the sending detection value Snd_Detect(t), the ES 52 shifts to a step S7 in FIG. 4. The States 52l determines if the present communication state is the receiving state or the sending state to set the state information. At the same time, the Rcv_Control 52e and the Snd_Control 52j conduct the control processing for the receiving detection value Rcv_Detect(t) and the sending detection value Snd_Detect(t), respectively. FIG. 13 is a flowchart sowing the processing procedures and the processing contents.

At first, the ES 52 operates the States 52l, thereby determines whether or not the state which is set now is "receiving state [States(t−1)=1]" (step S701). If the current state is not the receiving state but "sending state [States(t−1)=0]", the ES 52 shifts to a step S702. The States 52l compares the calculated present received power value Rcv_Power(t) with a value in which an offset value E is added to the present sending power value Snd_Power(t) to determine if the equation Rcv_Power(t)>Snd_Power(t)+E is satisfied. The offset value E acts to have hysteresis to the switching between the receiving state and the sending state. At the same time, the States 52l compares the present received power value Rcv_Power(t) to the present receiving detection value Rcv_Detect(t) to determine if the equation:

Rcv_Power(t)>Rcv_Detect(t) is satisfied. As the result of the determination, the equations:

Rcv_Power(t)>Snd_Power(t)+ϵ and Rcv_Power(t)>Rcv_Detect(t) are satisfied, the ES 52 shifts to a step S703s. The States 52l changes the state information from "sending state [States(t−1)=0]" to "receiving state [States(t)=1]" (step S703). The Snd_Control 52j initializes the sending detection value Snd_Detect(t) (step S704). This initialization process is executed in calculation by the equation of Snd_Detect(t)=ρ+φs as mentioned in the step S109 in FIG. 5.

In contrast, in the determination in the step S702, it is assumed that at least either the equation Rcv_Power(t)>Snd_Power(t)+ϵ or Rcv_Power(t)>Rcv_Detect(t) is not satisfied. In this case, the ES 52 shifts to a step S705. Then, the States 52l continues the "sending state" [States(t)=0]. The Rcv_Control 52e determines that the following equation:

[Snd_Power(t−1)−Snd_Detect(t)]×[Snd_Power(t)−Snd_Detect(t)]<0 is satisfied or not (step S706). If the result of the determination satisfies the above-described equation, the ES 52 shifts to a step S707. The Rcv_Control 52e initializes the receiving detection value Rcv_Detect(t). This initialization is executed in the calculation by the equation of Rcv_Detect(t)=ρ+φr as already mentioned in the step S108 in FIG. 5. In the event of no satisfaction of the just-described equation, the ES 52 terminates the state determination processing.

On the other hand, it is assumed that the currently set state is "receiving state [States(t−1)=1] as the result of the determination in the step S701. In this case, the ES 52 shifts to a step S708. The States 52l determines whether the equation Snd_Power(t)>Rcv_Power(t−Delay)+ζ is given or not by comparing the calculated present sending power value Snd_Power(t) to a value in which an offset value ζ is added to the previous received power value Rcv_Power(t−Delay) including a delay element. The "Delay" indicates a delay time with consideration of an acoustic echo sneaked from the receive path to the send path, and the value ζ indicates an offset value to give a hysteresis property to the switching between the receiving state and the sending state.

At the same time, the States 52l compares the present sending power value Snd_Power(t) with the present sending detection value Snd_Detect(t) and determines if the relation Snd_Power(t)>Snd_Detect(t) is given (step S708). As the result of the determination, if the relations Snd_Power(t)>Rcv_Power(t−Delay)+ζ and Snd_Power(t)>Snd_Detect(t) are given, the ES 52 shifts to a step S709. The States 52l changes the state information from "receiving state [States(t−1)=1] to "sending state [States(t)=0]". The Rcv_Control 52e initializes the receiving detection value Rcv_detect(t) (step S710). This initialization is executed in the calculation in accordance with the equation Rcv_Detect(t)=ρ+φr as stated in the step S108 in FIG. 5.

In contrast, in the step S708, if at least either the relation Snd_Power(t)>Rcv_Power(t−Delay)+ζ or Snd_Power(t)>Snd_Detect(t) is not given, then, the ES 52 shifts to a step S711. The States 52l continues "receiving state" [States(t)=1] (step S711). The Snd_Control 52j determines if the following equation is satisfied or not (step S712).

[Rcv_Power(t−1)−Rcv_Detect(t)]×[Rcv_Power(t)−Rcv_Detect(t)]<0

As the result of this determination, if this equation is satisfied, the ES 52 shifts to S713. The Snd_Control 52j initializes the sending detection value Snd_Detect(t). This initialization is executed in the calculation in accordance with the equation Snd_Detect(t)=ρ+φs as stated in the step S109 in FIG. 5. If this equation is not satisfied, the ES 52 terminates this state determination processing.

As mentioned above, in the state determination processing, in the receiving detection value control processing and in the sending detection value control processing, at every switching [States(t−1)=0] and also [states(t)=1] from "sending state" to "receiving state", the sending detection value Snd_Detect(t) is initializes. And at every switching [States(t−1)=1] and also [states(t)=0] from "receiving state" to "sending state", the receiving detection value Rcv_Detect(t) is initializes. If the state information is "sending state [States(t)=0]", the receiving detection value Rcv_Detect(t) is initialized at every change in the sign of difference between the sending power value Snd_Power(t) and the sending detection value Snd_Detect(t) (from plus sign to minus sign or from minus sign to plus sign). If the state information is "receiving state [States(t)=1]", the sending detection value Snd_Detect(t) is initialized at every change in the sign of difference between received power value Rcv_Power(t) and the receiving detection value Rcv_Detect(t) (from plus sign to minus sign or from minus sign to plus sign). Thereby, it is possible for the sending state and the receiving state no to be excessively changed resulting from the change in the received power value Rcv_Power(t) and the sending power value Snd_Power(t).

Figure 14:
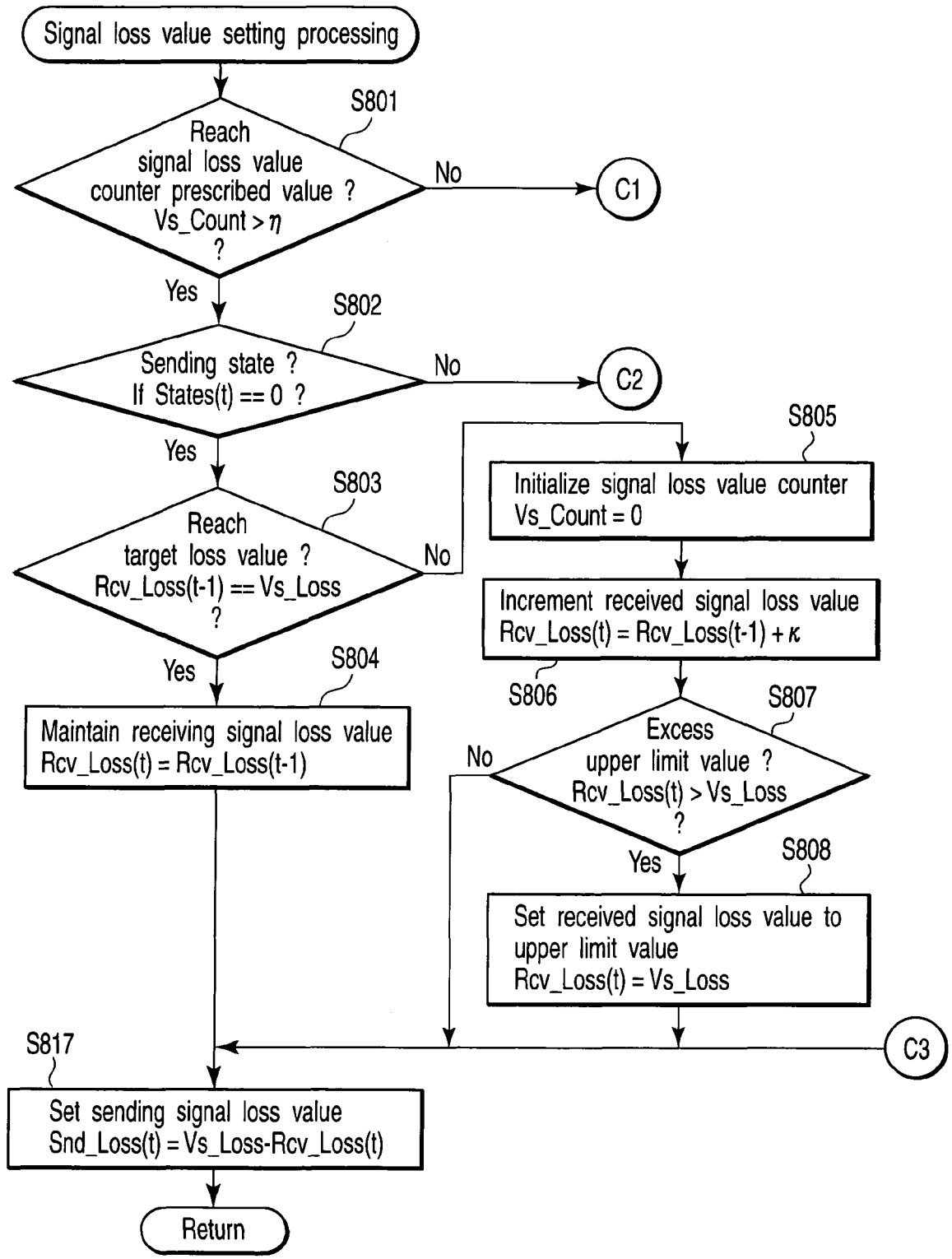
FIG. 14 is a flowchart showing procedures and contents of signal loss value setting processing in the control procedures shown in FIG. 4.
Figure 15:
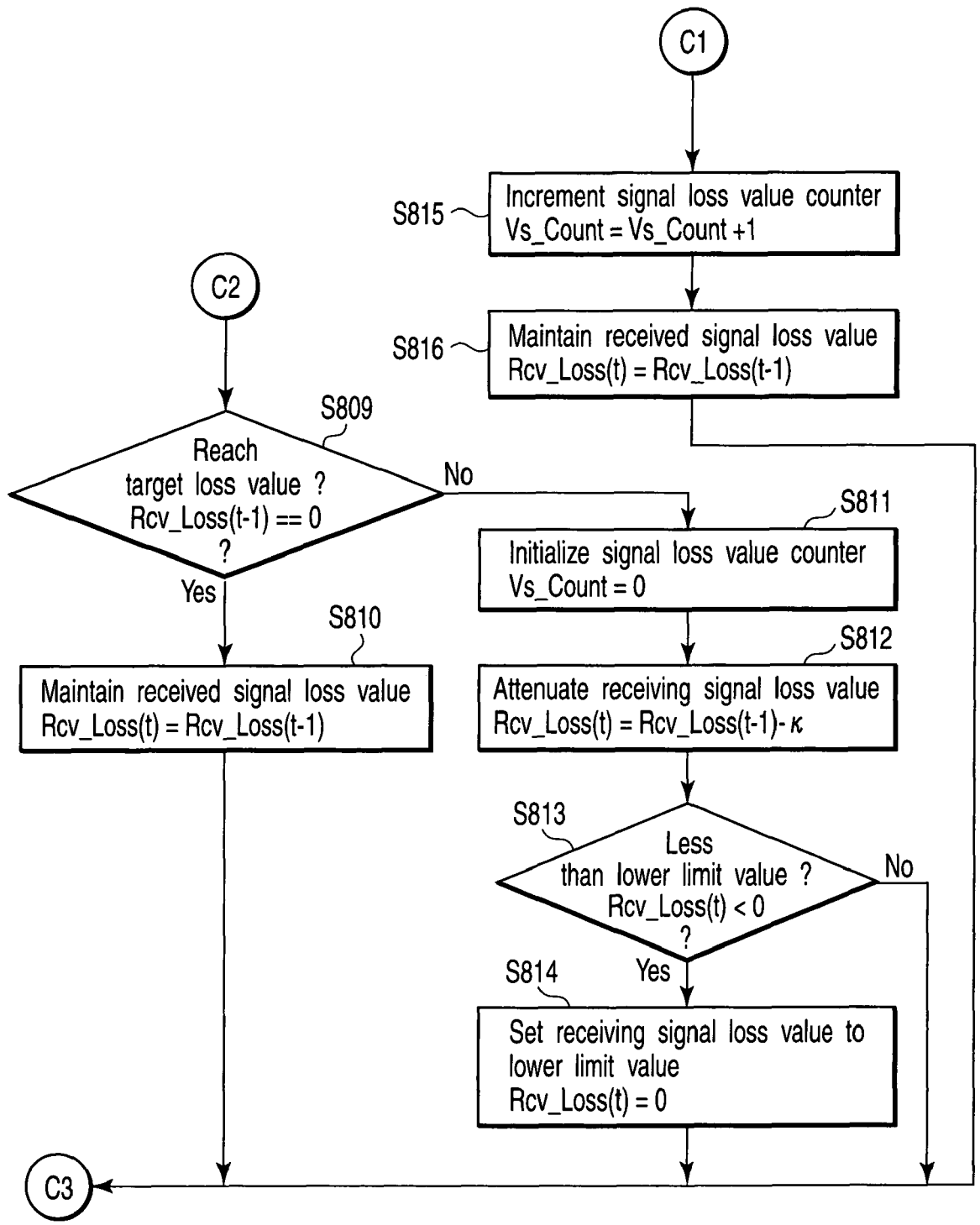
FIG. 15 is a flowchart showing procedures and contents of signal loss value setting processing in the control procedures shown in FIG. 4.

When the state determination is terminated as mentioned above, the States 52l shifts to the step S8 in FIG. 5 and sets the received signal loss value Rcv_Loss(t) and the sending signal loss value Snd_Loss(t) there. FIGS. 14 and 15 are a flowchart showing its processing procedures and processing contents.

The States 52l determines that the signal loss value counter Vs_Count has reached or not the constant value η (step S801). As the result of the determination, the equation Vs_Count>η is not given, the ES 52 shifts to a step 815 then the States 52l increments the signal loss value counter VS_Count. Then the ES 52 shifts to a step 816 to set a new received signal loss value Rcv_Loss(t) to the previous received signal loss value Rcv_Loss(t−1) and shifts to a step S817.

In contrast, if it is determined that the equation Vs_Count>η is given in the step S801, the States 52*l* determines whether the current state is "receiving state [States(t)= 1]" or "sending state [States(t)=0]" (step S802). In the case of "sending state [States (t)=0]", the ES 52 shifts to a step S803 and the States 52*l* determines whether or not the received signal loss value Rcv_loss(t−1) is equal to the signal loss value Vs_Loss which is read out from the Loss 52*k*. As the result of the determination, the equation Rcv_Loss(t−1)=Vs_Loss is given, the ES 52 shifts to a step S804 to set a new received signal loss value Rcv_Loss(t) to the previous received signal loss value Rcv_loss(t−1) then shifts to a step S817.

On the other hand, if it is determined in the step S803 that the Rcv_Loss(t−1) is not equal to the Vs_Loss, the ES 52 shifts to a step S805 and initializes the signal loss counter (Vs_Count=0), then, shifts to a step S806 to increase the received signal loss value Rcv_Loss(t) from the previous received signal loss value Rcv_Loss(t−1) by the value κ (Rcv_Loss(t)=Rcv_Loss(t−1)+κ). The value κ is a positive value which is set in accordance with the signal loss value Vs_Loss being read out from the Loss 52*k*. The ES 52 shifts to a step S807 to determine if the Rcv_Loss(t) excesses the Vs_Loss. At the result of the determination, if the relation Rcv_Loss(t)>Vs_Loss is given, the ES 52 shifts to a step S808 to set the received signal loss value Rcv_Loss(t) to the Vs_Loss and shifts to a step S817.

If it is determined in the step S802 that the equation "receiving state [States(t)=1]" is in satisfaction, the ES 52 shifts to a step S809 to determines if the received signal loss value Rcv_Loss(t−1) is equal to 0. As the result of the determination, the received signal loss value Rcv_Loss(t−1) is equal to 0, the ES 52 shifts to a step S810 and sets a new received signal loss value Rcv_Loss(t) to the previous received signal loss value Rcv_Loss(t−1) then shifts to a step S817.

In the step S809, if it is determined that Rcv_Loss(t−1) ≠ 0, the ES 52 shifts to a step S811 and initializes the signal loss counter (Vs_Count=0), then the ES 52 shifts to a step S812 to subtract the received signal loss value Rcv_Loss(t) from the previous received signal loss value Rcv_Loss(t−1) by the value κ. The ES 52 shifts to a step S813 to determine if the Rcv_Loss(t) is less than 0. If Rcv_Loss(t)<0 is satisfied in the step S813, the ES 52 shifts to a step S814 to set the received signal loss value Rcv_Loss(t) to 0 and shifts to a step S817. In contrast, even in the case of no determination of the relation of Rcv_Loss(t)<0 in the step S813, the ES 52 shifts to the step S817.

At last, the States 52*l* subtracts the present received signal loss value Rcv_Loss (t) from the signal loss value Vs_loss read out from the Loss 52*k* to obtain the sending signal loss value Snd_Loss(t) [Snd_Loss(t)=Vs_Loss_Rcv_Loss(t)] (step S817) then the ES 52 terminates this signal loss value setting processing.

After completing this signal loss value setting process as mentioned above then the ES 52 shifts to the step 9 in FIG. 5 and conducts the signal attenuation processing there. FIG. 16 is a flowchart showing its processing procedures and the processing contents.

The ES 52 determines if the received signal loss value Rcv_Loss(t) is 0 (step S901). In the case that the received signal loss value Rcv_Loss (t) is not 0, the ES 52 shifts to a step 902. The received signal attenuating section 52*m* attenuates the received signal on the receive path on the basis of the received signal loss value Rcv_Loss(t). Subsequently, the ES 52 shifts to a step S903 to determine if the sending signal loss value Snd_Loss(t) is 0 or not. In the case that the sending signal loss value Snd_Loss(t) is not equal to 0, the ES 52 shifts to a step S904. Then, the sending signal attenuating section 52*n* attenuates the sending signal on the send path on the basis of the sending signal loss value Snd_Loss(t).

After completion of the signal attenuation processing, the control unit 10 determines whether the communication by the user has terminated or not in the step S10 in FIG. 4. If the communication has been still continued, the ES 52 set the time t to t+1 and returns to the step S2 in FIG. 4 to repeatedly execute the processing S2-S9 already shown in FIG. 4. In contrast, if the communication has not been continued, the ES 52 terminates the sequence of the processing.

The ES 52 has been explained on the premise that it is one to be composed and operated by parameters of time domain types. In the event that the ES 52 is realized in a band division (subband) type using a band division filter, etc. or in a frequency domain type using an FFT, etc., the parameters may be set at every frequency band (bin) or at every group of frequency band (bin).

As it is obvious from the above-mentioned configurations and operations, the ES 52 in the embodiment of the present invention has the following operations and effects.

Figure 17:
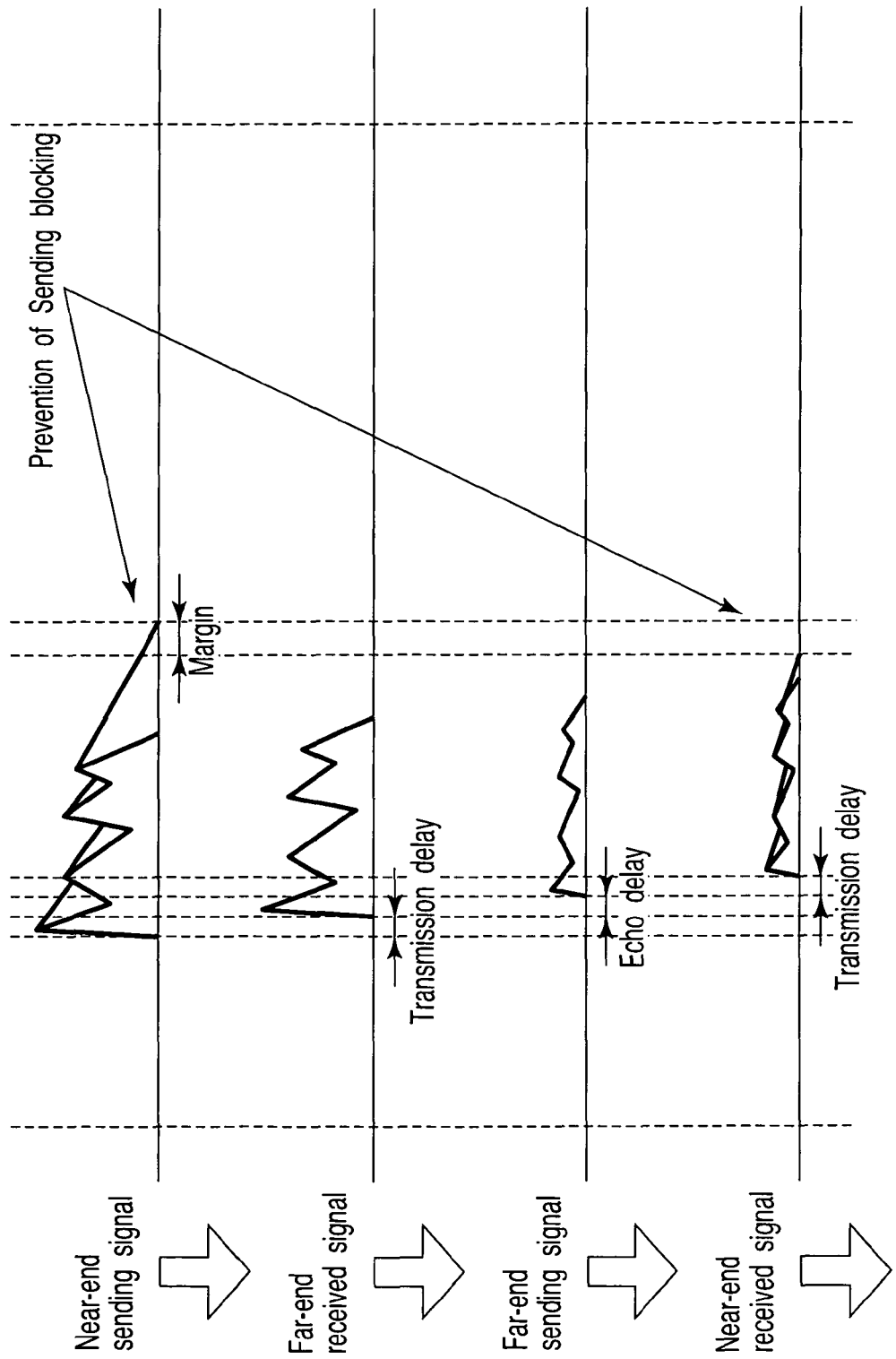
FIG. 17 is a signal waveform view for explaining sending blocking preventing operations by the echo suppressor shown in FIG. 3.

(1) In the calculation of the receiving power value Rcv_Power(t) and the sending power value Snd_Power(t), the ES 52 calculates the previous received power value λr×Rcv_Power(t−1) and the previous sending power value λs×Snd_Power(t−1) by using the forgetting coefficients λr (0≦λr≦1) and the λs (0≦λs≦1). Thereby, margins are set in speech sections and the sections longer than their original sections become to be recognized as speech sections as shown in FIG. 17. Accordingly, the sending blocking caused by the acoustic echoes which have returned via the terminal on the far-end can be prevented.

Figure 21:
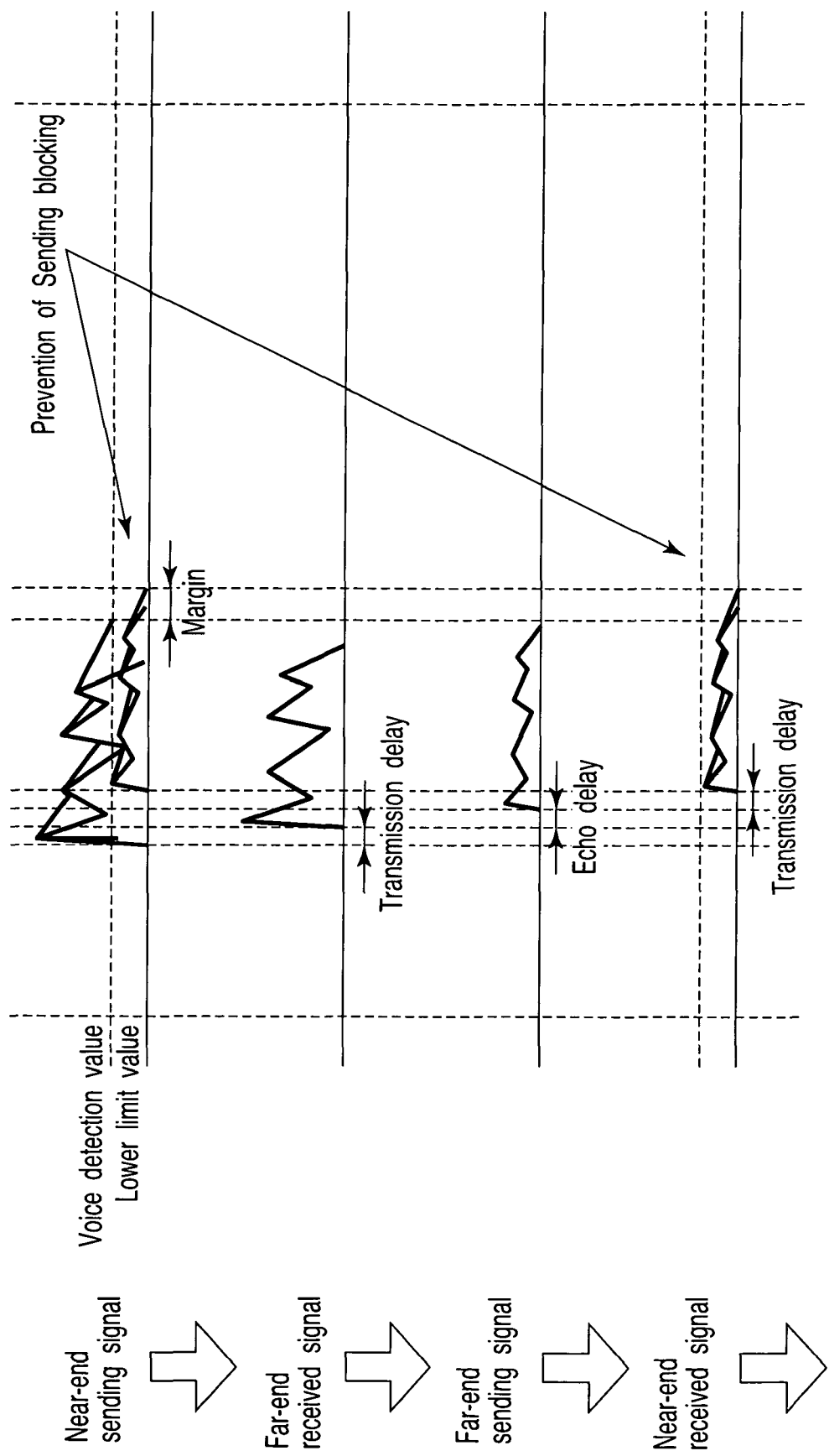
FIG. 21 is a signal waveform view for explaining another example of the sending blocking preventing operations by the echo suppressor shown in FIG. 3.

(2) The Rcv_Control 52*e* and the Snd_Control 52*j* respectively control the receiving detection value Rcv_Detect(t) and the sending detection value Snd_Detect(t), thereby the receiving detection value Rcv_Detect(t) and the sending detection value Snd_Detect(t) are set not to become smaller than each of the lower limit values Rcv_Detect_Min and Snd_Detect_Min, respectively. Therefore, even if the acoustic echo is returned from the terminal on the far-end to the near-end as shown in FIG. 21, the sending blocking is prevented by setting the lower limit levels to be the value larger than the level of the acoustic echo.

(3) Furthermore, the lower limit values Rcv_Detect_Min and the Snd_Detect_Min are variably set in response to the volume setting operations by the user. Thereby, the receiving detection value Rcv_Detect(t) and the sending detection value Snd_Detect(t) are always set to the values to which the user volume setting values are reflected. Accordingly, the ES 52 can stably determine the receiving state and the sending state without affected by the user volume setting values.

Figure 18:
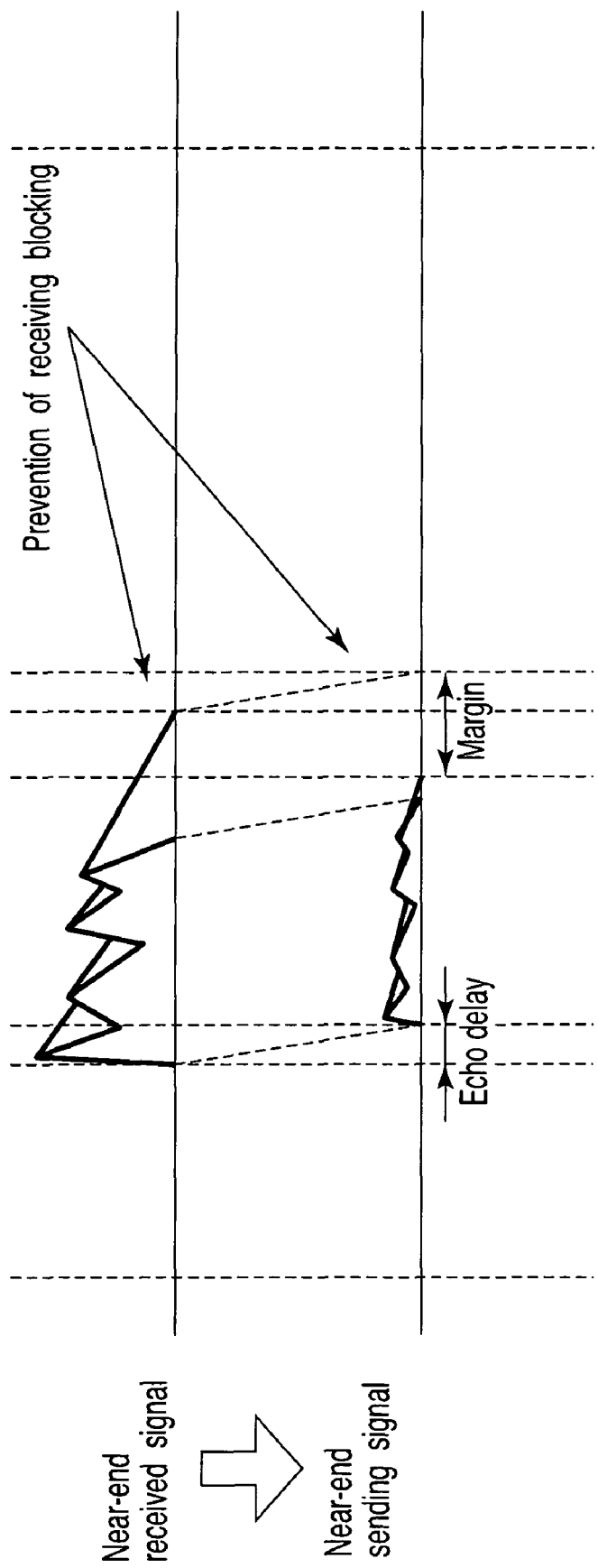
FIG. 18 is a signal waveform view for explaining receiving blocking preventing operations by the echo suppressor shown in FIG. 3.

(4) The States 52*l* compares the present sending power value Snd_Power(t) with the previous received power value Rcv_Power(t−Delay)+ζ which is made by adding the received power value Rcv_Power(t) to the offset value ζ and by considering the delay time Delay of the receiving acoustic echo. And the States 52*l* determines whether the relation Snd_Power(t)>Rcv_Power(t−Delay)+ζ is given or not, and then, the switching from the receiving state to the sending state is detected. Therefore, margins are provided into the speech sections as shown in FIG. 18 as an example, so that the receiving blocking is prevented.

Figure 19:
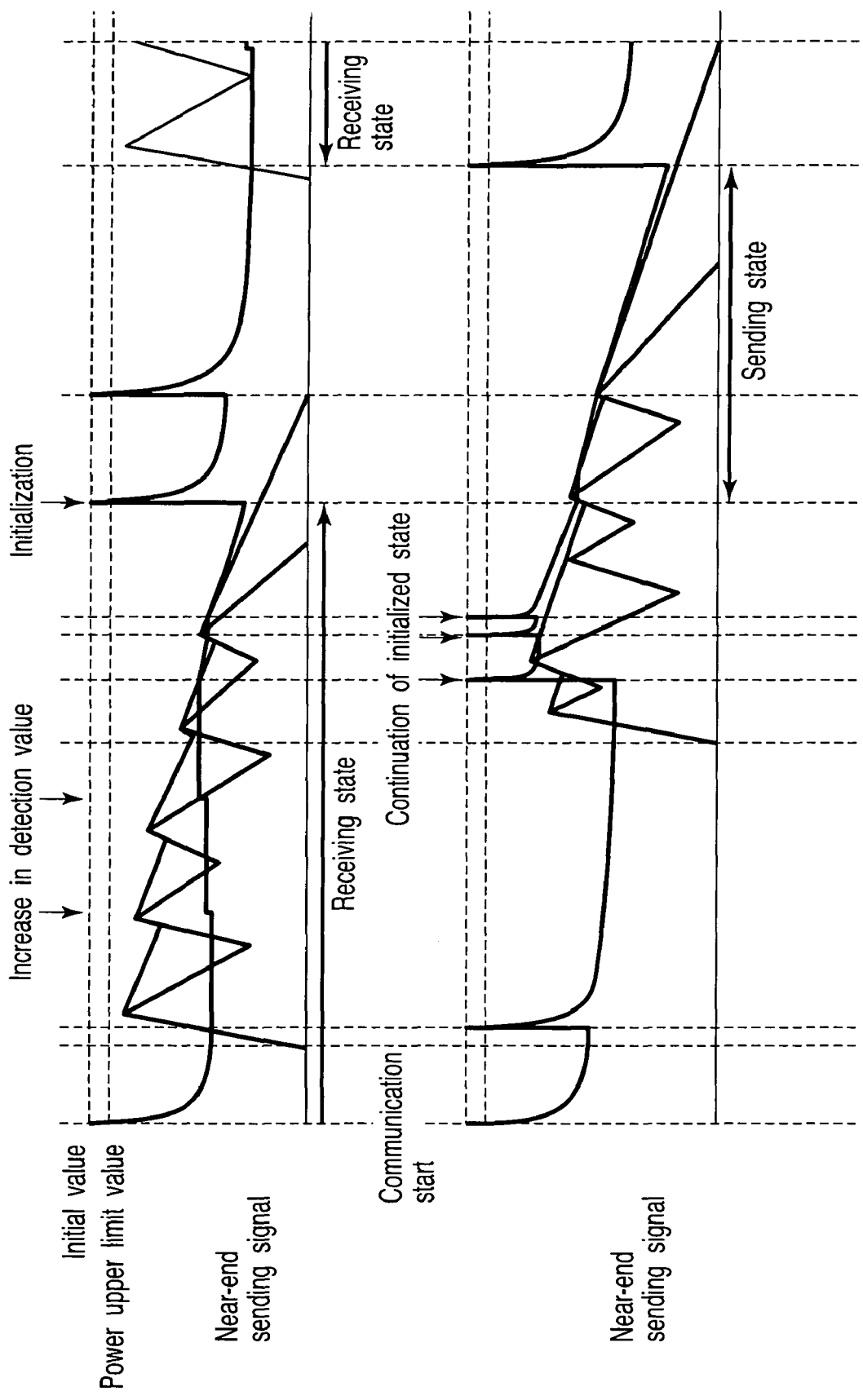
FIG. 19 is a signal waveform view for explaining switching operations between a receiving state and a sending state by the echo suppressor shown in FIG. 3.

(5) For example, as shown in FIG. 19, the received power value Rcv_Power(t) and the sending power value Snd_Power (t) are initially set to the values larger than the logical maximum values of the received power and the sending power, respectively, at every switching between the receiving state and the sending state before the interactive communication starts. On the basis of the initial setting values of the received power and the sending power, the receiving detection value Rcv_Detect(t) and the sending detection value Snd_Detect(t) are initially set. Therefore, at the time of initial setting, the receiving detection value Rcv_Detect(t) and the sending detection value Snd_Detect(t) become to be set to the values always larger than the speech power values (the received power and the sending power) which are resulted from the case in which the user setting volume is set to the maximum value and the sending volume is overflowed. Accordingly, the ES 52 becomes easy to detect the section with the large of the speech power values (the received power and the sending power), thereby the ES 52 can detect the speech section even if the sending signal level is slightly larger than the acoustic echo level of the received signal.

(6) For instance, as shown in FIG. 19, when the received power value Rcv_Power(t) has lowered less than the receiving detection value Rcv_Detect(t), the sending detection value Snd_Detect(t) is initialized to the maximum value, and when the sending power value Snd_Power(t) has lowered less then the sending detection value Snd_Detect(t), the receiving detection value Rcv_Detect(t) is initialized to the maximum value. Thereby, the ES 52 can avoid excessive switching between the sending state and the receiving state. The receiving detection value Rcv_Detect(t) and the sending detection value Snd_Detect(t) are kept in high values and the background noise is prevented from being erroneously detected, so that the affection of the variations in the background noise can be reduced.

Figure 20:
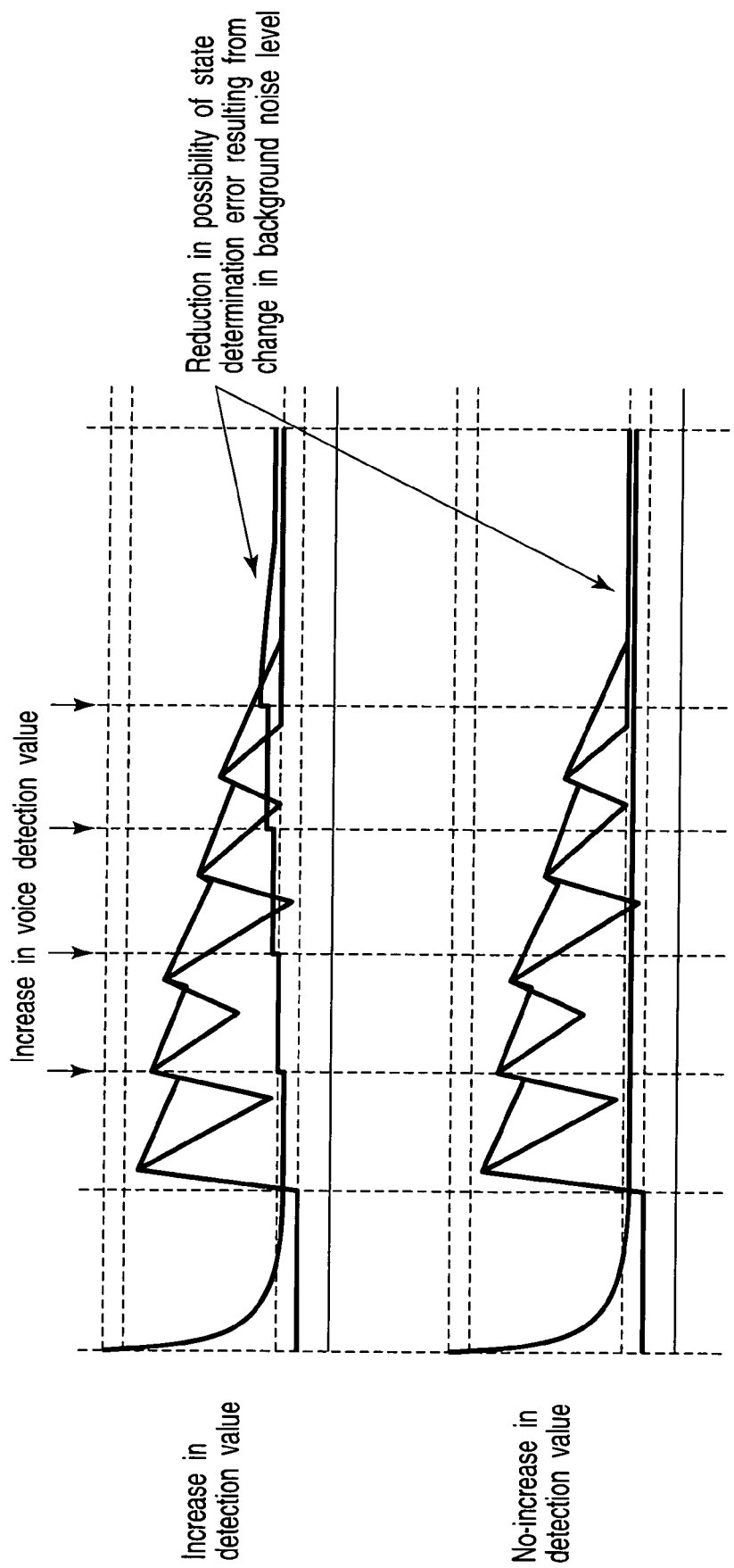
FIG. 20 is a signal waveform view for explaining preventing operations of a state determination error by the echo suppressor shown in FIG. 3.

(7) As shown in FIG. 19 and FIG. 20, in calculation of the receiving detection value Rcv_Detect(t), if the state in which the received power value Rcv_Power(t) is smaller than the previous receiving detection value Rcv_Detect(t−1) has continued not less than a specified time period, the receiving detection value Rcv_Detect(t) gradually increases the constant $\delta r$ each. And in calculation of the sending detection value Snd_Detect(t), if the state in which the sending power value Snd_Power(t) is smaller than the previous sending detection value Snd_Detect(t−1) has continued not less than a specified time period, the sending detection value Snd_Detect (t) gradually increases the constant $\delta s$ each. Accordingly, even when the speech detection values (the receiving detection value and the sending detection value) becomes an extremely small one and a long time averaged power value of the background noise is varied, the ES 52 can reduce a possibility of occurrence of the erroneous determination of the sending state and the receiving state, thereby the ES 52 prevents failures of unnecessary long sustainment of the sending state and the receiving state.

(8) In the calculation of the received power value Rcv_Power(t) and the sending power value Snd_Power(t), each of the receiving gain value $\phi r$ and the sending gain value $\phi s$ are added to the general value of the received power and the general value of the sending power, respectively. By calculating like this, even if the sending power becomes larger then the received power resulting from the setting operation of the user volume controller 51 or the designing of the level diagram, the ES 52 can prevent the receiving state and the sending state from being erroneously determined at the beginning of the communication.

(9) Further, the receiving gain value $\phi r$ and the sending gain value $\phi s$ can be arbitrary set by the key operations of the user through the input device 12. Thereby, the user can arbitrary set in response to its favorite to take a priority of the receiving state, namely a priority of the elimination of the interruption feelings of the receiving speech, or to take a priority of the elimination of the interruption feelings of the sending speech.

Meanwhile, the present invention is not limited to the foregoing embodiments, a variety of modifications as follows are available.

The receiving gain value $\phi r$ and the sending gain value $\phi s$ may be the same or different in each value. The receiving gain value $\phi r$ and the sending gain value $\phi s$ may be variably set in response to the user volume setting values. Further, in the calculation of the received power value and the sending power value, the ES 52 may respectively subtract each of the receiving gain value $\phi r$ and the sending gain value $\phi s$ from the general value of the received power value and the general value of the sending power value.

The offset values $\epsilon$ and $\zeta$ to give the hysteresis property to the switching between the receiving state and the sending state may be respectively and variably set in accordance with the received power value or the receiving detection value and the sending power value or the sending detection value. And the offset values $\epsilon$ and $\zeta$ may be variably set in accordance with the user volume setting value. The States 52*l* may variably set a hangover time period on the basis of the speech power values (the received power and the sending power) and the speech detection values (the receiving detection value and the sending detection value) so as to continue the state. The constant terms $\gamma r$ and $\gamma s$ used for calculating the receiving detection value Rcv_Detect(t) and the sending detection value Snd_Detect(t) may be variably set on the basis of the variance of noises.

Although in the embodiments, the ES 52 sets the receiving state as the initial state and sets the receiving state as the priority state, the ES 52 may set the sending state as the initial state and sets the sending state as the priority state, in reverse.

In fact, the invention is not limited to the specific embodiments as they are, the constituent elements can be modified and can be brought into shape without departing from the spirit or scope of the invention in the steps of the implementation. A variety of inventions can be formed by appropriate combinations of a plurality of constituent elements disclosed in the foregoing embodiments. For example, some of the constituent elements can be eliminated among the whole of the constituent elements disclosed in the embodiments. Moreover, the constituent elements over the different embodiments can be appropriately combined.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An echo suppressor comprising:
a received power calculating unit to calculate received power of a received signal every predetermined time;
a sending power calculating unit to calculate sending power of a sending signal every predetermined time;
a receiving detection value calculating unit to calculate a receiving detection value based on the calculated received power;
a sending detection value calculating unit to calculate a sending detection value based on the calculated sending power;

a received signal attenuating unit to attenuate the received signal;

a sending signal attenuating unit to attenuate the sending signal; and a state determining unit to determine that a state is a receiving state when the calculated received power is larger than the receiving detection value and larger than the calculated sending power, and to determine that the state is a sending state when the calculated sending power is larger than the sending detection value and larger than the calculated received power, thereby controlling attenuation processing operations of the received signal attenuating unit and the sending signal attenuating unit based on the determination results.

2. The echo suppressor according to claim 1, further comprising:

a receiving detection value controlling unit including a first lower limit controlling unit to control the calculated receiving detection value so as not to become less than a predetermined first lower limit value;

a sending detection value controlling unit including a second lower limit controlling unit to control the calculated sending detection value so as not to become less than a predetermined second lower limit value;

wherein the state determining unit detects a receiving state using the receiving detection value controlled by the receiving detection value controlling unit, and the state determining unit detects a sending state using the sending detection value controlled by the sending detection value controlling unit.

3. The echo suppressor according to claim 2, wherein the first lower limit controlling unit sets the first lower limit value to be larger than an actually measured value of a level of an echo returned from a far end to a near end, and the second lower limit controlling unit sets the second lower limit value to be larger than an actually measured value of a level of an echo wraparounded from a near-end receiving side to a near-end sending side.

4. The echo suppressor according to claim 2, wherein at least one of the receiving detection value controlling unit and the sending detection value controlling unit includes a unit to initialize the receiving or sending detection value to a value larger than a maximum value of the calculated received or sending power at a beginning of a communication and when the initialization is set.

5. The echo suppressor according to claim 2, wherein the receiving detection value controlling unit includes a unit to initialize the receiving detection value at every switching from the receiving state determined by the state determining unit to the sending state determined by the state determining unit.

6. The echo suppressor according to claim 2, wherein the sending detection value controlling unit includes a unit to initialize the sending detection value at every switching from the sending state determined by the state determining unit to the receiving state determined by the state determining unit.

7. The echo suppressor according to claim 2, wherein the receiving detection value controlling unit includes a unit to add a gain value to the calculated receiving detection value when the fact that the calculated receiving detection value is not more than the calculated received power lasts for a predetermined time period, and wherein the gain value is preset based on variation widths of noise components included in the received signal and a speech level of speech included in the received signal.

8. The echo suppressor according to claim 2, wherein the sending detection value controlling unit includes a unit to add a gain value to the calculated sending detection value when the fact that the calculated sending detection value is not more than the calculated sending power lasts for a predetermined time period, and wherein the gain value is preset based on variation widths of noise components included in the sending signal and a speech level of speech included in the sending signal.

9. The echo suppressor according to claim 2, wherein the sending detection value controlling unit includes a unit to initialize the calculated sending detection value when the state determined by the state determining unit is the receiving state and at every change in sign of a difference between the calculated received power and the calculated receiving detection value.

10. The echo suppressor according to claim 2, wherein the receiving detection value controlling includes a unit to initialize the calculated receiving detection value when the state determined by the state determining unit is the sending state and at every change in sign of a difference between the calculated sending power and the calculated sending detection value.

11. The echo suppressor according to claim 1, wherein the receiving detection value calculating unit calculates the receiving detection value using a linear sum of a first value which is obtained by giving a predetermined weight to the calculated received power and a second value which is obtained by giving a predetermined weight to a predetermined-time-older receiving detection value when the calculated received power is smaller than the predetermined-time-older receiving detection value, and wherein the predetermined-time-older receiving detection value is set as the receiving detection value when the calculated received power is larger than the predetermined-time-older receiving detection value.

12. The echo suppressor according to claim 1, wherein the sending detection value calculating unit calculates the sending detection value using a linear sum of a first value which is obtained by giving a predetermined weight to the calculated sending power and a second value which is obtained by giving a predetermined weight to a predetermined-time-older sending detection value when the calculated sending power is smaller than the predetermined-time-older sending detection value, and wherein the predetermined-time-older sending detection value is set as the sending detection value when the calculated sending power is larger than the predetermined-time-older sending detection value.

13. A signal processing device comprising:

a received power calculating unit to calculate received power of a received signal every predetermined time;

a sending power calculating unit to calculate sending power of a sending signal every predetermined time;

a receiving detection value calculating unit to calculate a receiving detection value based on the calculated received power;

a sending detection value calculating unit to calculate a sending detection value based on the calculated sending power; and a state determining unit to determine that a state is a receiving state when the calculated received power is larger than the receiving detection value and larger than the calculated sending power, and to determine that the state is a sending state when the calculated sending power is larger than the sending detection value and larger than the calculated received power.

14. A signal processing method for a signal processing device, the method comprising:

calculating received power of a received signal every predetermined time;

calculating sending power of a sending signal every predetermined time;

calculating a receiving detection value based on the calculated received power;

calculating a sending detection value based on the calculated sending power; and determining that a state is a receiving state when the calculated received power is larger than the receiving detection value and larger than the calculated sending power, and determining that the state is a sending state when the calculated sending power is larger than the sending detection value and larger than the calculated received power.

* * * * *